US009185558B2

(12) United States Patent
Kihara et al.

(10) Patent No.: US 9,185,558 B2
(45) Date of Patent: Nov. 10, 2015

(54) AUTHENTICATION SERVER AND AUTHENTICATION METHOD BY AUTHENTICATION SERVER

(75) Inventors: Masami Kihara, Chiyoda-ku (JP);
Takahiro Tsuchiya, Chiyoda-ku (JP)

(73) Assignee: NIHON UNIVERSITY, Tokyo (JP)

( * ) Notice: Subject to any disclaimer, the term of this patent is extended or adjusted under 35 U.S.C. 154(b) by 94 days.

(21) Appl. No.: 13/883,967

(22) PCT Filed: Nov. 2, 2011

(86) PCT No.: PCT/JP2011/075277
§ 371 (c)(1),
(2), (4) Date: May 7, 2013

(87) PCT Pub. No.: WO2012/063699
PCT Pub. Date: May 18, 2012

(65) Prior Publication Data
US 2013/0232550 A1    Sep. 5, 2013

(30) Foreign Application Priority Data

Nov. 8, 2010  (JP) ................................ 2010-250290
Nov. 8, 2010  (JP) ................................ 2010-250292
May 25, 2011  (JP) ................................ 2011-117429

(51) Int. Cl.
*G06F 7/04* (2006.01)
*G06F 15/16* (2006.01)
(Continued)

(52) U.S. Cl.
CPC ............. *H04W 12/06* (2013.01); *G06F 21/554* (2013.01); *H04L 63/102* (2013.01); *H04W 12/08* (2013.01)

(58) Field of Classification Search
CPC .................................................... H04W 12/06

USPC ............................................... 713/168; 726/3
See application file for complete search history.

(56) References Cited

U.S. PATENT DOCUMENTS 6,178,177 B1 * 1/2001 Vautey ........................ 370/445
6,731,731 B1 * 5/2004 Ueshima ...................... 379/196
(Continued)

FOREIGN PATENT DOCUMENTS

JP      2004-222270      8/2004
JP      2005-295297      10/2005
(Continued)

OTHER PUBLICATIONS

International Preliminary Report on Patentability dated May 23, 2013, corresponding to patent application No. PCT/JP2011/075277.
(Continued)

*Primary Examiner* — Taghi Arani
*Assistant Examiner* — Khalil Naghdali
(74) *Attorney, Agent, or Firm* — Ohlandt Greeley Ruggiero & Perle L.L.P.

(57) ABSTRACT

An authentication server capable of determining securely and accurately whether an access source is a cellular phone or a computer when a content is accessed with being limited to cellular phone users. The authentication server including a transmission delay time measuring unit that measures a transmission delay time between the authentication server and a communication terminal over a plurality of times, a transmission delay time distribution property determining unit that determines whether or not a distribution property of the transmission delay time measured over the plurality of times is discrete, and a content access authentication unit recognizing that the communication terminal is a wireless communication terminal and approving the access to the contents when the distribution property of the transmission delay time is determined as being discrete and recognizing that the communication terminal is a wired communication terminal and denying the access to the contents when the distribution property of the transmission delay time is determined as not being discrete.

14 Claims, 21 Drawing Sheets

(51) Int. Cl.
*G06F 17/30* (2006.01)
*H04L 29/06* (2006.01)
*H04W 12/06* (2009.01)
*G06F 21/55* (2013.01)
*H04W 12/08* (2009.01)

(56) References Cited

U.S. PATENT DOCUMENTS

| | | | |
|---|---|---|---|
| 8,112,114 B2 * | 2/2012 | Bubien, Jr. ................ | 455/556.1 |
| 2004/0176947 A1 * | 9/2004 | Miyake et al. ............... | 704/201 |
| 2007/0206838 A1 * | 9/2007 | Fouquet ........................ | 382/115 |
| 2011/0167264 A1 * | 7/2011 | Takahashi et al. ........... | 713/168 |
| 2012/0036278 A1 * | 2/2012 | Rafsky et al. ................ | 709/232 |
| 2013/0227648 A1 * | 8/2013 | Ricci .............................. | 726/3 |

FOREIGN PATENT DOCUMENTS

| JP | 2007-089065 | 4/2007 |
|---|---|---|
| JP | 2008-524681 | 7/2008 |
| JP | 2008-287542 | 11/2008 |

OTHER PUBLICATIONS

Tsuchiya, et al., "Transmission Time-based Authentication Scheme Using 3G Mobile Device for DRM System", Proceedings of the 2009 IEEE European Frequency and Time Forum & International Frequency Control Symposium, Apr. 2009, pp. 706-710.

Tsuchiya, et al., "A Method for Distinguishing Between Cellular Phone and PC Using Transmission Delay in Internet Access", 2011 Nen the Institute of Electronics, Information and Communication Engineers Sogo Taikai Koen Ronbunshu, Tsushin 2, Feb. 28, 2011, pp. 231 with English translation consisting of 4 pages.

International Search Report dated Jan. 24, 2012 for corresponding International Patent Application No. PCT/JP2011/075277 with English translation (8 pages).

* cited by examiner

AUTHENTICATION SERVER AND AUTHENTICATION METHOD BY AUTHENTICATION SERVER

BACKGROUND

1. Field of the Disclosure

The present disclosure relates to an authentication server and an authentication method by an authentication server that prevent an access from a computer and approve an access from a cellular phone when a content is accessed with being limited to cellular phone users.

2. Discussion of the Background Art

When a content is accessed with being limited to cellular phone users, it is necessary to prevent an access from a computer and to approve an access from a cellular phone. According to a conventional technology, it is determined whether an access source is a cellular phone or a computer by referring to the IP address of the access source.

Patent Document 1: Japanese Patent Application Laid-Open (JP-A) No. 2005-295297

Patent Document 2: JP-A No. 2007-89065

However, the IP address may be disguised by a computer or may be changed by a cellular phone service provider. Accordingly, it cannot be determined securely and accurately either an access source is a cellular phone or a computer.

In Patent Documents 1 and 2, by measuring a transmission delay time between the two communication terminals, by measuring a transmission delay time between the two communication terminals, one communication terminal of the two communication terminals authenticates the other communication terminal. However, it is not determined whether the other communication terminal is a cellular phone or a computer.

Thus, in order to solve the problem, a first object of a first disclosure is to provide an authentication server and an authentication method by an authentication server capable of securely and accurately determining whether an access source is a cellular phone or a computer when a content is accessed with being limited to cellular phone users.

Recently, cellular phones called smartphones having functions similar to those of a computer are widely used, and the smartphones use the Internet that is generally used. However, since an ID generated in the generally-used Internet is not a unique ID having a high security level, by referring to the ID that is generated in the generally-used Internet, it cannot be securely and accurately determined whether a cellular phone user is a regular user.

In Patent Documents 1 and 2, by measuring a transmission delay time between the two communication terminals, by measuring a distance between two communication terminals, one communication terminal of the two communication terminals authenticates the other communication terminal. However, regardless of the distance between the two communication terminals, it is not determined whether or not the user of the other communication terminal is a regular user.

Thus, in order to solve the problem, a second object of a second disclosure is to provide an authentication server and an authentication method by an authentication server capable of securely and accurately determining whether or not a cellular phone user is a regular user when a content is accessed with being limited to cellular phone users.

SUMMARY

In order to achieve the above-described first object, it is determined whether a communication terminal is a wireless communication terminal such as a cellular phone or a wired communication terminal such as a computer based on whether or not a distribution property of a transmission delay time between an authentication server and a communication terminal is discrete.

Specifically, the first disclosure is an authentication server including: a data communication unit that performs data communication with a communication terminal performing authentication for an access to contents; a transmission delay time measuring unit that measures a transmission delay time between the data communication unit and the communication terminal over a plurality of times; a transmission delay time distribution property determining unit that determines whether or not a distribution property of the transmission delay time measured over the plurality of times is discrete; and a content access authentication unit that approves the access to the contents when the distribution property of the transmission delay time is determined as being discrete and denies the access to the contents when the distribution property of the transmission delay time is determined as not being discrete.

According to this configuration, it can be determined securely and accurately whether an access source is a cellular phone or a computer when a content is accessed with being limited to cellular phone users. In addition, since the above-described determination is performed not by the access source but by the authentication server, there is no possibility that the above-described distribution property may be disguised by a computer.

The first disclosure is the authentication server, wherein the data communication unit transmits an HTML file including a plurality of data elements to the communication terminal and receives request signals requesting the data elements from the communication terminal, and the transmission delay time measuring unit measures a total of a transmission delay time from the data communication unit to the communication terminal and a transmission delay time from the communication terminal to the data communication unit by measuring intervals at which the request signals requesting the data elements are received from the communication terminal.

According to such a configuration, the access source may include a web browser and not include software for measuring a transmission delay time.

The data communication unit may sequentially repeat reception of one of the request signals and transmission of one of the data elements, and the transmission delay time measuring unit may measure the total of the transmission delay times by measuring intervals at which the request signals are received.

According to such a configuration, even in the case of a communication terminal performing pipeline processing, by measuring intervals at which the request signals requesting data elements are received from the communication terminal, a total of a transmission delay time from the data communication unit to the communication terminal and a transmission delay time from the communication terminal to the data communication unit can be measured.

The first disclosure is the authentication server, wherein the data communication unit receives a close signal of a connection from the communication terminal that has received the data elements, and the transmission delay time measuring unit measures a total of a transmission delay time from the data communication unit to the communication terminal and a transmission delay time from the communication terminal to the data communication unit by measuring a time interval until reception of the close signal after reception of the request signals.

According to such a configuration, the transmission delay time can be measured without using dedicated software. In addition, since the connection with the communication terminal is used, transmission delay times for a plurality of communication terminals can be measured in a parallel manner.

The first disclosure is the authentication server, wherein the data communication unit performs telephone communication for the communication terminal, and the content access authentication unit approves the access to the contents when the distribution property of the transmission delay time is determined as being discrete, and an incoming call reply is made from the communication terminal for the telephone communication and denies the access to the contents when the distribution property of the transmission delay time is determined as being discrete, and an incoming call reply is not made from the communication terminal for the telephone communication.

According to such a configuration, in a case where an actual access source is a data module of a computer, the access source can be reliably prevented from being determined as a cellular phone.

The first disclosure is an authentication method by an authentication server, the authentication method sequentially including: a content access authentication receiving step for receiving authentication for an access to contents that is performed by a communication terminal; a transmission delay time measuring step for measuring a transmission delay time delayed with respect to the communication terminal over a plurality of times; a transmission delay time distribution property determining step for determining whether or not a distribution property of the transmission delay time measured over the plurality of times is discrete; and a content access authentication step for approving the access to the contents when the distribution property of the transmission delay time is determined as being discrete and denying the access to the contents when the distribution property of the transmission delay time is determined as not being discrete.

According to this configuration, it can be determined securely and accurately whether an access source is a cellular phone or a computer when a content is accessed with being limited to cellular phone users. Since the above-described determination is performed not by the access source but by the authentication server, there is no concern that the above-described distribution property may be disguised by a computer.

The first disclosure is the authentication method by an authentication server, wherein, in the transmission delay time measuring step, an HTML file including a plurality of data elements is transmitted to the communication terminal, request signals requesting the data elements are received from the communication terminal, and a total of a transmission delay time from the authentication server to the communication terminal and a transmission delay time from the communication terminal to the authentication server is measured by measuring intervals at which the request signals requesting the data elements are received from the communication terminal.

According to such a configuration, the access source may include a web browser and not include software for measuring a transmission delay time.

In the transmission delay time measuring step, reception of one of the request signals and transmission of one of the data elements may be sequentially repeated, and the total of the transmission delay times may be measured by measuring intervals at which the request signals are received.

According to the disclosure, even in the case of a communication terminal performing pipeline processing, by measuring intervals at which the request signals requesting data elements are received from the communication terminal, a total of a transmission delay time from the data communication unit to the communication terminal and a transmission delay time from the communication terminal to the data communication unit can be measured.

The first disclosure is the authentication method by an authentication server, wherein, in the transmission delay time measuring step, a close signal of a connection is received from the communication terminal that has received the data elements, and a total of a transmission delay time from the data communication unit to the communication terminal and a transmission delay time from the communication terminal to the data communication unit is measured by measuring a time interval until reception of the close signal after reception of the request signals.

According to such a configuration, the transmission delay time can be measured without using dedicated software. In addition, since the connection with the communication terminal is used, transmission delay times for a plurality of communication terminals can be measured in a parallel manner.

The first disclosure is the authentication method by an authentication server, wherein, in the content access authentication step, telephone communication is performed for the communication terminal, the access to the contents is approved when the distribution property of the transmission delay time is determined as being discrete and an incoming call reply is made from the communication terminal for the telephone communication, and the access to the contents is denied when the distribution property of the transmission delay time is determined as being discrete and an incoming call reply is not made from the communication terminal for the telephone communication.

According to such a configuration, in a case where an actual access source is a data module of a computer, the access source can be reliably prevented from being determined as a cellular phone.

In the authentication server according to the first disclosure, the data communication unit may perform telephone communication for the communication terminal, and the content access authentication unit may approve the access to the contents when the distribution property of the transmission delay time is determined as being discrete, and the distribution property of the transmission delay time changes for the telephone communication and deny the access to the contents when the distribution property of the transmission delay time is determined as being discrete, and the distribution property of the transmission delay time does not change for the telephone communication.

Since the content access authentication unit determines whether or not the distribution property of the transmission delay time has changed for telephone communication, the authentication server according to the first disclosure can check that the communication terminal is a wireless communication terminal having a phone call function. Then, since the authentication for providing contents is performed in a state in which the content access authentication unit checks that the communication terminal is a wireless communication terminal having a phone call function, it can be determined more securely and accurately whether the access source is a mobile communication terminal or a computer.

In the authentication method by an authentication server according to the first disclosure, in the content access authentication step, telephone communication may be performed for the communication terminal, the access to the contents may be approved when the distribution property of the transmission delay time is determined as being discrete and the distribution property of the transmission delay time changes for the telephone communication, and the access to the contents may be denied when the distribution property of the transmission delay time is determined as being discrete and the distribution property of the transmission delay time does not change for the telephone communication.

In the content access authentication step, since it is determined whether or not the distribution property of the transmission delay time has changed for the telephone communication, according to the authentication method by an authentication server according to the first disclosure, it can be checked that the communication terminal is a wireless communication terminal having a phone call function. In addition, in the content access authentication step, since the authentication for providing contents is performed in a state in which it is checked that the communication terminal is a wireless communication terminal having a phone call function, it can be determined more securely and accurately whether the access source is a mobile communication terminal or a computer.

Specifically, the authentication server according to the first disclosure includes: a data communication unit that performs data communication with a communication terminal performing authentication for an access to contents; a transmission delay time measuring unit that measures a transmission delay time between the data communication unit and the communication terminal over a plurality of times; an extraction unit that accumulates the transmission delay times measured by the transmission delay time measuring unit, detects a peak value of the transmission delay times, and extracts the transmission delay time in a predetermined range including the peak values; a distribution property calculating unit that calculates a distribution property of the transmission delay time extracted by the extraction unit; a distribution property determining unit that determines whether or not the distribution property of the transmission delay time calculated by the distribution property calculating unit is discrete; and a content access authentication unit that approves the access to the contents when the distribution property is determined as being discrete by the distribution property determining unit and denies the access to the contents when the distribution property is determined as not being discrete by the distribution property determining unit.

The authentication server according to the first disclosure includes the data communication unit, the transmission delay time measuring unit, the extraction unit, the distribution property calculating unit, and the distribution property determining unit, and accordingly, it can be determined whether the communication terminal is a wireless communication terminal or a wired communication terminal. Since the authentication server according to the first disclosure includes the content access authentication unit, the supply of contents to a communication terminal can be enabled in a case where the communication terminal is a wireless communication terminal, and the supply of contents to a communication terminal can be prevented in a case where the communication terminal is a wired communication terminal. As a result, the authentication server according to the first disclosure can determine whether the access source is a mobile communication terminal or a computer. Here, according to the authentication server of the first disclosure, the authentication is performed by the authentication server, and accordingly, the determination can be made securely and accurately. Therefore, according to the first disclosure, it can be determined securely and accurately whether the access source is a mobile communication terminal or a computer when a content is accessed with being limited to mobile communication terminal users.

In the authentication server according to the first disclosure, the data communication unit may transmit an HTML file including a plurality of data elements to the communication terminal and receive request signals requesting the data elements from the communication terminal, and the transmission delay time measuring unit may measure a transmission delay time from the data communication unit to the communication terminal by measuring intervals at which the request signals requesting the data elements are received from the communication terminal.

According to the first disclosure, by only allowing the communication terminal to access a web browser, the authentication can be performed, and accordingly, special software used for measuring the transmission delay time does not need to be installed to the communication terminal. Accordingly, the authentication can be performed in an easy manner.

Here, the data communication unit may sequentially repeat reception of one of the request signals and transmission of one of the data elements, and the transmission delay time measuring unit may measure the total of the transmission delay times by measuring intervals at which the request signals are received.

According to the disclosure, even in the case of a communication terminal performing pipeline processing, by measuring intervals at which the request signals requesting data elements are received from the communication terminal, a total of a transmission delay time from the data communication unit to the communication terminal and a transmission delay time from the communication terminal to the data communication unit can be measured.

The first disclosure is the authentication server, wherein the data communication unit receives a close signal of a connection from the communication terminal that has received the data elements, and the transmission delay time measuring unit measures a total of a transmission delay time from the data communication unit to the communication terminal and a transmission delay time from the communication terminal to the data communication unit by measuring a time interval until reception of the close signal after reception of the request signals.

According to such a configuration, the transmission delay time can be measured without using dedicated software. In addition, since the connection with the communication terminal is used, transmission delay times for a plurality of communication terminals can be measured in a parallel manner.

The authentication server according to the first disclosure further includes a phone call determining unit that determines whether or not the data communication unit has received an incoming call reply from the communication terminal, wherein the data communication unit may perform telephone communication for the communication terminal, and the content access authentication unit may approve the access to the contents in a case where the distribution property is determined as being discrete by the distribution property determining unit and the incoming call reply is determined to have been received by the phone call determining unit and deny the access to the contents in a case where the distribution property is determined as not being discrete by the distribution property determining unit or the incoming call reply is determined not to have been received by the phone call determining unit.

Since the authentication server according to the first disclosure includes the phone call determining unit, it can be determined that a communication terminal has a phone call function. Then, since the authentication for providing contents is performed in a state in which the content access authentication unit checks that the communication terminal has a phone call function, it can be determined more securely and accurately whether the access source is a mobile communication terminal or a computer.

The authentication server according to the first disclosure further includes a phone call change determining unit that determines whether or not the distribution property of the transmission delay time calculated by the distribution property calculating unit has changed when telephone communication performed by the data communication unit is detected, wherein the data communication unit may perform the telephone communication for the communication terminal, the content access authentication unit may approve the access to the contents in a case where the distribution property is determined as being discrete by the distribution property determining unit and the distribution property of the transmission delay time is determined to have changed by the phone call change determining unit and deny the access to the contents in a case where the distribution property is determined as not being discrete by the distribution property determining unit or the distribution property of the transmission delay time is determined not to have changed by the phone call change determining unit.

Since the authentication server according to the first disclosure includes the phone call change determining unit, it can be determined that a communication terminal is a wireless communication terminal having a phone call function. Then, since the authentication for providing contents is performed in a state in which the content access authentication unit checks that the communication terminal is a wireless communication terminal having a phone call function, it can be determined more securely and accurately whether the access source is a mobile communication terminal or a computer.

Specifically, the authentication method by an authentication server according to the first disclosure sequentially includes: a distribution property determining step for performing data communication with a communication terminal performing authentication for an access to contents by using a data communication unit, measuring a transmission delay time delayed with respect to the communication terminal over a plurality of times by using a transmission delay time measuring unit, accumulating the transmission delay times, detecting a peak value of the transmission delay times, and extracting the transmission delay time in a predetermined range including the peak values by using an extraction unit, calculating a distribution property of the extracted transmission delay time by using a distribution property calculating unit, and determining whether or not the calculated distribution property is discrete by using a distribution property determining unit; and a content access authentication step for approving the access to the contents when the distribution property is determined as being discrete in the distribution property determining step and denying the access to the contents when the distribution property is determined as not being discrete in the distribution property determining step.

Since the authentication method by an authentication server according to the first disclosure includes the distribution property determining step, it can be determined whether the communication terminal is a wireless communication terminal or a wired communication terminal. Since the authentication method by an authentication server according to the first disclosure includes the content access authentication step, the supply of contents to a communication terminal can be enabled in a case where the communication terminal is a wireless communication terminal, and the supply of contents to a communication terminal can be prevented in a case where the communication terminal is a wired communication terminal. As a result, the authentication server according to the first disclosure can determine whether the access source is a mobile communication terminal or a computer. Here, according to the authentication method by an authentication server according to the first disclosure, the authentication is performed by the authentication server, and accordingly, the determination can be made securely and accurately. Therefore, according to the first disclosure, it can be determined securely and accurately whether the access source is a mobile communication terminal or a computer when a content is accessed with being limited to mobile communication terminal users.

In the authentication method by an authentication server according to the first disclosure, in the distribution property determining step, an HTML file including a plurality of data elements may be transmitted to the communication terminal, request signals requesting the data elements may be received from the communication terminal, and a transmission delay time from the authentication server to the communication terminal may be measured by measuring intervals at which the request signals requesting the data elements are received from the communication terminal by the transmission delay time measuring unit.

According to the first disclosure, by only allowing the communication terminal to access a web browser, the authentication can be performed, and accordingly, special software used for measuring the transmission delay time does not need to be installed to the communication terminal. Accordingly, the authentication can be performed in an easy manner.

In the distribution property determining step, reception of one of the request signals and transmission of one of the data elements may be sequentially repeated, and a total of the transmission delay times may be measured by measuring intervals at which the request signals are received.

According to the disclosure, even in the case of a communication terminal performing pipeline processing, by measuring intervals at which the request signals requesting data elements are received from the communication terminal, a total of a transmission delay time from the data communication unit to the communication terminal and a transmission delay time from the communication terminal to the data communication unit can be measured.

The first disclosure is the authentication method by an authentication server, wherein, in the distribution property determining step, a close signal of a connection is received from the communication terminal that has received the data elements, and a total of a transmission delay time from the data communication unit to the communication terminal and a transmission delay time from the communication terminal to the data communication unit is measured by measuring a time interval until reception of the close signal after reception of the request signals.

According to such a configuration, the transmission delay time can be measured without using dedicated software. In addition, since the connection with the communication terminal is used, transmission delay times for a plurality of communication terminals can be measured in a parallel manner.

The authentication method by an authentication server according to the first disclosure further includes a phone call determining step for performing telephone communication for the communication terminal using the data communication unit and determining using a phone call determining unit whether or not the data communication unit receives an incoming call reply from the communication terminal before the distribution property determining step, simultaneously with the distribution property determining step, or between the distribution property determining step and the content access authentication step, wherein, in the content access authentication step, the content access authentication unit may approve the access to the contents in a case where the distribution property is determined as being discrete in the distribution property determining step and the incoming call reply is determined to have been received in the phone call determining step and deny the access to the contents in a case where the distribution property is determined as not being discrete in the distribution property determining step or the incoming call reply is determined not to have been received in the phone call determining step.

Since the authentication method by an authentication server according to the first disclosure includes the phone call determining step, it can be checked that the communication terminal has a phone call function. In addition, in the content access authentication step, since the authentication for providing contents is performed in a state in which it is checked that the communication terminal has a phone call function, it can be determined more securely and accurately whether the access source is a mobile communication terminal or a computer.

The authentication method by an authentication server according to the first disclosure further includes a phone call change determining step for performing telephone communication for the communication terminal using the data communication unit and determining using a phone call change determining unit whether or not the distribution property of the transmission delay time calculated by the distribution property calculating unit has changed after the telephone communication performed by the data communication unit before the distribution property determining step, simultaneously with the distribution property determining step or between the distribution property determining step and the content access authentication step. wherein, in the content access authentication step, the content access authentication unit may approve the access to the contents in a case where the distribution property is determined as being discrete in the distribution property determining step and the distribution property of the transmission delay time is determined to have changed in the phone call change determining step and deny the access to the contents in a case where the distribution property is determined as not being discrete in the distribution property determining step or the distribution property of the transmission delay time is determined not to have changed in the phone call change determining step.

Since the authentication method by an authentication server according to the first disclosure includes the phone call change determining step, it can be checked that the communication terminal is a wireless communication terminal having a phone call function. In addition, in the content access authentication step, since the authentication for providing contents is performed in a state in which it is checked that the communication terminal is a wireless communication terminal having a phone call function, it can be determined more securely and accurately whether the access source is a mobile communication terminal or a computer.

In order to achieve the above-described second object, it is determined whether or not a user using the communication terminal is a regular user based on whether the transmission delay time between the authentication server and the communication terminal changes before and after performing telephone communication from the authentication server to the communication terminal.

Specifically, the second disclosure is an authentication server including: a data communication unit that performs data communication with a communication terminal performing authentication for an access to contents; a correspondence table that associates an identifier or a password of the communication terminal with a telephone number of the communication terminal; a telephone communication unit that performs telephone communication using the telephone number associated with the identifier or the password in the correspondence table when the data communication unit performs authentication for an access to contents using the identifier or the password from the communication terminal; a transmission delay time measuring unit that measures a transmission delay time between the data communication unit and the communication terminal over a plurality of times; a transmission delay time change determining unit that determines whether or not the transmission delay time measured by the transmission delay time measuring unit at a time when the telephone communication unit performs telephone communication has changed from the transmission delay time at a time when the telephone communication unit does not perform the telephone communication; and a content access authentication unit that approves the access to the contents when the transmission delay time is determined to have changed by the transmission delay time change determining unit and denies the access to the contents when the transmission delay time is determined not to have changed by the transmission delay time change determining unit.

According to this configuration, it can be confirmed whether or not the communication terminal performing the authentication and the communication terminal receiving the telephone communication are the same communication terminal. Accordingly, when a content is accessed with being limited to cellular phone users, it can be determined securely and accurately whether a user using the cellular phone is a regular user.

The second disclosure is the authentication server, wherein the data communication unit transmits an HTML file including a plurality of data elements to the communication terminal and receives request signals requesting the data elements from the communication terminal, and the transmission delay time measuring unit measures a total of a transmission delay time from the data communication unit to the communication terminal and a transmission delay time from the communication terminal to the data communication unit by measuring intervals at which the request signals requesting the data elements are received from the communication terminal.

According to such a configuration, the cellular phone may include a web browser and not include software for measuring a transmission delay time.

The data communication unit may sequentially repeat reception of one of the request signals and transmission of one of the data elements, and the transmission delay time measuring unit may measure the total of the transmission delay times by measuring intervals at which the request signals are received.

According to the disclosure, even in the case of a communication terminal performing pipeline processing, by measuring intervals at which the request signals requesting data elements are received from the communication terminal, a total of a transmission delay time from the data communication unit to the communication terminal and a transmission delay time from the communication terminal to the data communication unit can be measured.

The second disclosure is the authentication server, wherein the data communication unit receives a close signal of a connection from the communication terminal that has received the data elements, and the transmission delay time measuring unit measures a total of a transmission delay time from the data communication unit to the communication terminal and a transmission delay time from the communication terminal to the data communication unit by measuring a time interval until reception of the close signal after reception of the request signals.

According to such a configuration, the transmission delay time can be measured without using dedicated software. In addition, since the connection with the communication terminal is used, transmission delay times for a plurality of communication terminals can be measured in a parallel manner.

The second disclosure is the authentication server, wherein the transmission delay time change determining unit determines whether or not the transmission delay time measured by the transmission delay time measuring unit has increased at a time when the telephone communication unit performs telephone communication from the transmission delay time at a time when the telephone communication unit does not perform the telephone communication, and the content access authentication unit approves the access to the contents when the transmission delay time change determining unit determines that the transmission delay time has increased and denies the access to the contents when the transmission delay time change determining unit determines that the transmission delay time has not increased.

According to this configuration, the content of a change in the transmission delay time can be variously set for each cellular phone.

The second disclosure is the authentication server, wherein the transmission delay time change determining unit determines whether or not the data communication unit has received a packet used for measuring the transmission delay time from the communication terminal when the telephone communication unit performs telephone communication, compared to when the telephone communication unit does not perform the telephone communication, and the content access authentication unit approves the access to the contents when the transmission delay time change determining unit determines that the packet used for measuring the transmission delay time has not been received and denies the access to the contents when the transmission delay time change determining unit determines that the packet used for measuring the transmission delay time has received.

According to this configuration, the content of a change in the transmission delay time can be variously set for each cellular phone.

The second disclosure is the authentication server, wherein the content access authentication unit approves the access to the contents when the transmission delay time change determining unit determines that the transmission delay time has changed and an incoming call reply has been made for the telephone communication from the communication terminal and denies the access to the contents when the transmission delay time change determining unit determines that the transmission delay time has changed and an incoming call reply has not been made from the communication terminal for the telephone communication.

According to this configuration, it can be determined more securely and accurately whether a user using the cellular phone is a regular user.

The second disclosure is an authentication method by an authentication server, the authentication method sequentially including: a content access authentication receiving step for receiving authentication for an access to contents that is performed by a communication terminal; a telephone communication performing step for performing telephone communication using a telephone number associated with an identifier or a password used for the authentication for the access to contents while a transmission delay time delayed with respect to the communication terminal is measured a plurality of times; a transmission delay time change determining step for determining whether or not the measured transmission delay time at a time when telephone communication is performed has changed from the transmission delay time at a time when the telephone communication is not performed; and a content access authentication step for approving the access to the contents when the transmission delay time is determined to have changed and denying the access to the contents when the transmission delay time is determined not to have changed.

According to this configuration, it can be checked whether or not the communication terminal performing the authentication and the communication terminal receiving the telephone communication are the same communication terminal. Accordingly, when a content is accessed with being limited to cellular phone users, it can be determined securely and accurately whether a user using the cellular phone is a regular user.

The second disclosure is the authentication method by an authentication server, wherein, in the telephone communication performing step, an HTML file including a plurality of data elements is transmitted to the communication terminal, request signals requesting the data elements are received from the communication terminal, and a total of a transmission delay time from the authentication server to the communication terminal and a transmission delay time from the communication terminal to the authentication server is measured by measuring intervals at which the request signals requesting the data elements are received from the communication terminal.

According to such a configuration, the communication terminal may include a web browser and not include software for measuring a transmission delay time.

In the telephone communication performing step, reception of one of the request signals and transmission of one of the data elements may be sequentially repeated, and a total of the transmission delay times may be measured by measuring intervals at which the request signals are received.

According to the disclosure, even in the case of a communication terminal performing pipeline processing, by measuring intervals at which the request signals requesting data elements are received from the communication terminal, a total of a transmission delay time from the data communication unit to the communication terminal and a transmission delay time from the communication terminal to the data communication unit can be measured.

The second disclosure is the authentication method by an authentication server, wherein, in the telephone communication performing step, a close signal of a connection is received from the communication terminal that has received the data elements, and a total of a transmission delay time from the authentication server to the communication terminal and a transmission delay time from the communication terminal to the authentication server is measured by measuring a time interval until reception of the close signal after reception of the request signals.

According to such a configuration, the transmission delay time can be measured without using dedicated software. In addition, since the connection with the communication terminal is used, transmission delay times for a plurality of communication terminals can be measured in a parallel manner.

The second disclosure is the authentication method by an authentication server, wherein, in the transmission delay time change determining step, it is determined whether or not the measured transmission delay time has increased at a time when the telephone communication is performed from the transmission delay time at a time when the telephone communication is not performed, and in the content access authentication step, the access to the contents is approved when the transmission delay time is determined to have increased and the access to the contents is denied when the transmission delay time is determined not to have increased.

According to this configuration, the content of a change in the transmission delay time can be variously set for each cellular phone.

The second disclosure is the authentication method by an authentication server, wherein, in the transmission delay time change determining step, it is determined whether or not a packet used for measuring the transmission delay time is received from the communication terminal when telephone communication is performed, compared to when the telephone communication is not performed, and in the content access authentication step, the access to the contents is approved when the packet used for measuring the transmission delay time is determined not to have been received and the access to the contents is denied when the packet used for measuring the transmission delay time is determined to have been received.

According to this configuration, the content of a change in the transmission delay time can be variously set for each cellular phone.

The second disclosure is the authentication method by an authentication server, wherein, in the content access authentication step, the access to the contents is approved when the transmission delay time is determined to have changed in the transmission delay time change determining step and an incoming call reply has been made from the communication terminal for the telephone communication and the access to the contents is denied when the transmission delay time is determined to have changed in the transmission delay time change determining step and an incoming call reply has not been made from the communication terminal for the telephone communication.

According to this configuration, it can be determined more securely and accurately whether a user using the cellular phone is a regular user.

In addition, the above-described disclosure can be combined as possibly as can be.

According to the first disclosure, there are provided an authentication server and an authentication method by an authentication server capable of securely and accurately determining whether an access source is a mobile communication terminal or a computer when a content is accessed with being limited to mobile communication terminal users.

According to the second disclosure, there are provided an authentication server and an authentication method by an authentication server capable of securely and accurately determining whether a user using a cellular phone is a regular user when a content is accessed with being limited to cellular phone users.

DETAILED DESCRIPTION OF THE PREFERRED EMBODIMENT

Figure 1:
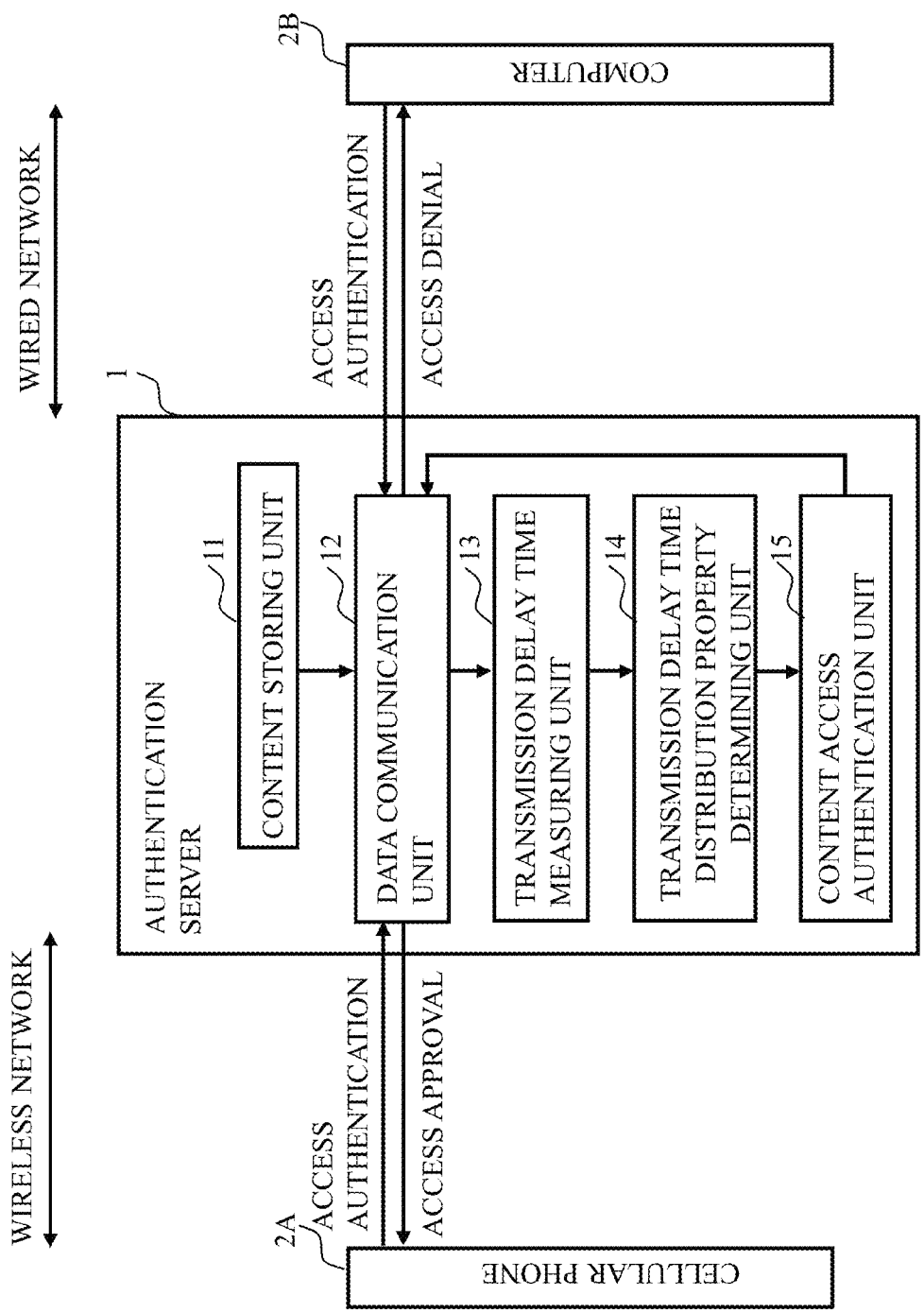
FIG. 1 is a diagram that illustrates the configuration of an authentication server.

Embodiments of a first disclosure will be described with reference to the accompanying drawings. The embodiments described below are examples of the present disclosure, and the present disclosure is not limited thereto. In this specification and the drawings, like reference numerals denote like constituent elements.

(Embodiment 1)

The configuration of an authentication server is illustrated in FIG. 1. When authentication of an access is received from a communication terminal 2, the authentication server 1 approves the access in a case where the communication terminal 2 is a cellular phone 2A connected through a wireless network and denies the access in a case where the communication terminal 2 is a computer 2B connected through a wired network. The authentication server 1 is configured by a content storing unit 11, a data communication unit 12, a transmission delay time measuring unit 13, a transmission delay time distribution property determining unit 14, and a content access authentication unit 15.

The content storing unit 11 stores contents. The data communication unit 12 performs data communication with a communication terminal 2 performing authentication for an access to contents. The transmission delay time measuring unit 13 measures a transmission delay time between the data communication unit 12 and the communication terminal 2 over a plurality of times. The transmission delay time distribution property determining unit 14 determines whether or not the distribution property of a transmission delay time measured over the plurality of times is discrete. The content access authentication unit 15 recognizes the communication terminal 2 as a wireless communication terminal and approves the access to contents when the distribution property of the transmission delay time has been determined as being discrete, and recognizes the communication terminal 2 as a wired communication terminal and denies the access to contents when the distribution property of the transmission delay time is determined as being non-discrete.

Figure 2:
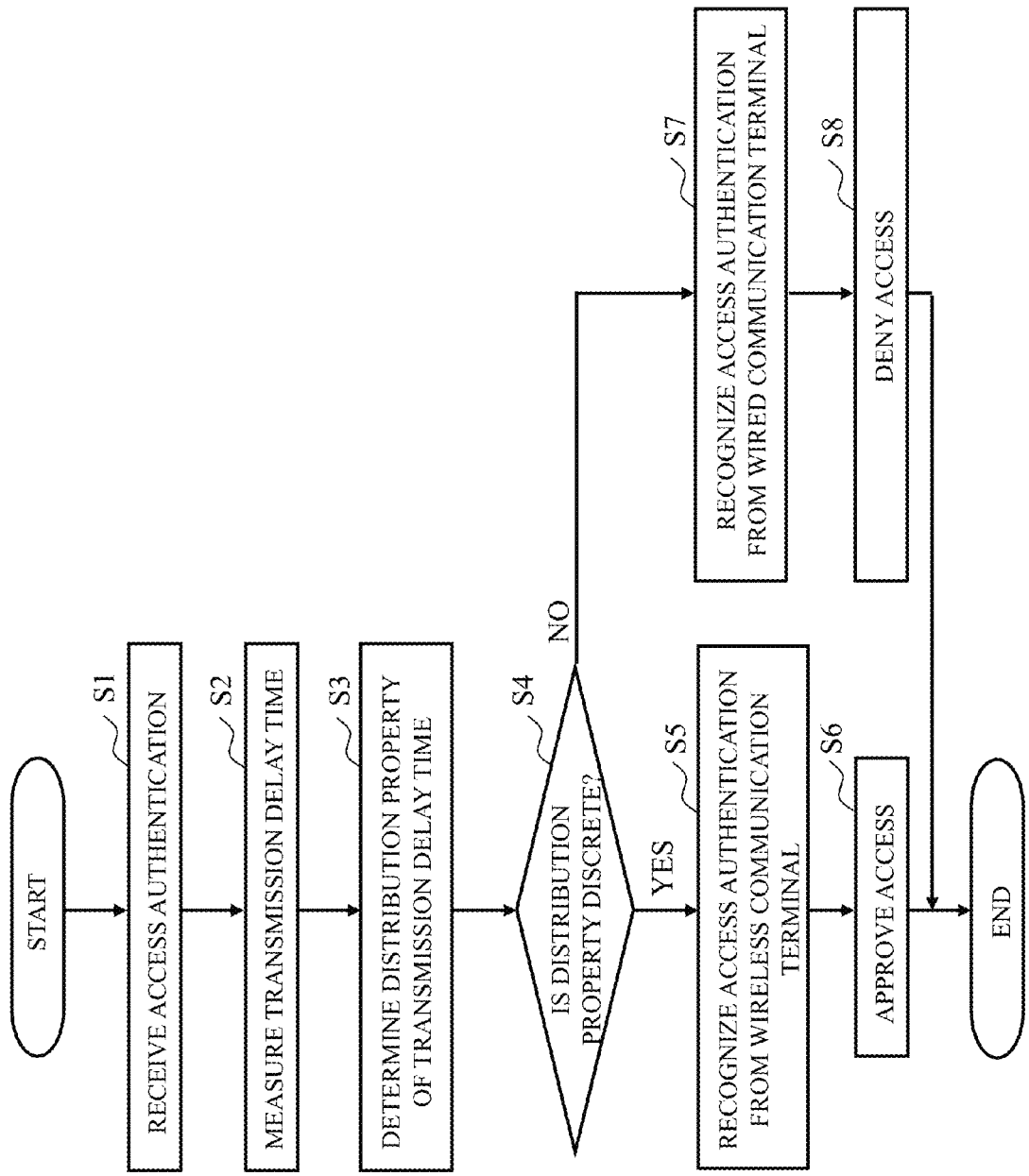
FIG. 2 is a diagram that illustrates the process of the authentication server.

The process of the authentication server is illustrated in FIG. 2. In a content access authentication receiving step, the data communication unit 12 receives authentication for an access to contents performed by the communication terminal 2 (Step S1). In a transmission delay time measuring step, the transmission delay time measuring unit 13 measures a transmission delay time delayed with respect to the communication terminal 2 over a plurality of times (Step S2). The transmission delay time measuring step will be described later in detail with reference to FIG. 3. In a transmission delay time distribution property determining step, the transmission delay time distribution property determining unit 14 determines whether or not the distribution property of transmission delay times measured over a plurality of times is discrete (Steps S3 and S4). The transmission delay time distribution property determining step will be described later in detail with reference to FIGS. 4 to 7.

The content access authentication step will be described. When the distribution property of transmission delay times is determined to be discrete ("Yes" in Step S4), the content access authentication unit 15 recognizes the communication terminal 2 as a wireless communication terminal (Step S5) and approves the access to contents (Step S6). Then, the data communication unit 12 notifies the cellular phone 2A of the approval of the access to contents and supplies a content stored in the content storing unit 11 to the cellular phone 2A. However, the data communication unit 12 may supply only the content stored in the content storing unit 11 to the cellular phone 2A instead of the approval of the access to contents. When the distribution property of transmission delay times is determined to be non-discrete ("No" in Step S4), the content access authentication unit 15 recognizes the communication terminal 2 as a wired communication terminal (Step S7) and denies the access to contents (Step S8). Then, the data communication unit 12 notifies the computer 2B of the denial of the access to contents.

When an access to contents of the authentication server 1 is limited to a user of the cellular phone 2A, it can be determined securely and accurately whether the communication terminal 2 is the cellular phone 2A or the computer 2B. Since the above-described determination is performed not by the communication terminal 2 but by the authentication server 1, there is no concern that the distribution property may be disguised by the computer 2B.

Figure 3:
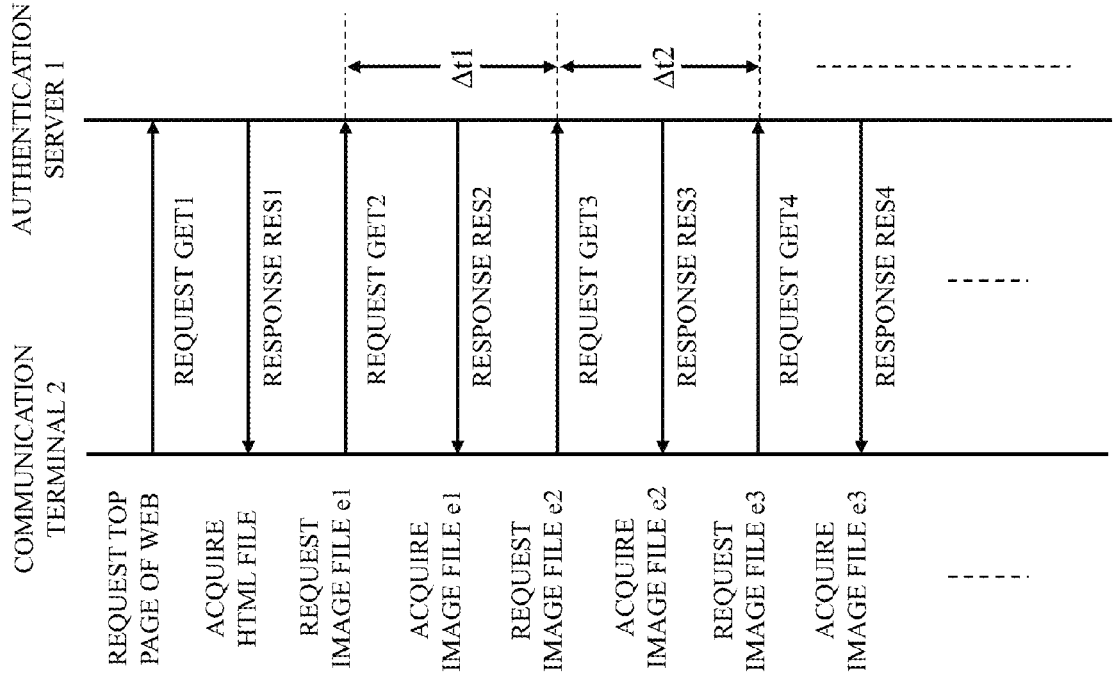
FIG. 3 is a diagram that illustrates a method of measuring a transmission delay time.

Next, the transmission delay time measuring step will be described in detail. A method of measuring a transmission delay time is illustrated in FIG. 3. The communication terminal 2 requests the top page of a web by transmitting a request GET1 to the authentication server 1. The data communication unit 12 supplies an HTML file by transmitting a response RES1 to the communication terminal 2. The communication terminal 2 analyzes the HTML file and requests a plurality of image files included in the HTML file as below.

The communication terminal 2 requests an image file e1 by transmitting a request GET2 to the authentication server 1. The data communication unit 12 supplies the image file e1 by transmitting a response RES2 to the communication terminal 2. The communication terminal 2 requests an image file e2 by transmitting a request GET3 to the authentication server 1. The data communication unit 12 supplies the image file e2 by transmitting a response RES3 to the communication terminal 2. The communication terminal 2 requests an image file e3 by transmitting a request GET4 to the authentication server 1. The data communication unit 12 supplies the image file e3 by transmitting a response RES4 to the communication terminal 2. Until the communication terminal 2 acquires all the image files included in the HTML file, the above-described process is repeated.

The transmission delay time measuring unit 13 measures a time $\Delta t1$ that is a time until a next request GET3 is received from the communication terminal 2 after the request GET2 is received from the communication terminal 2 as a total of a transmission delay time from the data communication unit 12 to the communication terminal 2 and a transmission delay time from the communication terminal 2 to the data communication unit 12. The transmission delay time measuring unit 13 measures a time $\Delta t2$ that is a time until a next request GET4 is received from the communication terminal 2 after the request GET3 is received from the communication terminal 2 as a total of a transmission delay time from the data communication unit 12 to the communication terminal 2 and a transmission delay time from the communication terminal 2 to the data communication unit 12. Until the data communication unit 12 supplies all the image files included in the HTML file, the above-described process is repeated.

Here, it is preferable that the transmission delay time measuring unit 13 does not measure a time until a next GET2 is received from the communication terminal 2 after a request GET1 is received from the communication terminal 2. The reason for this is that the time not only includes the transmission delay time from the data communication unit 12 to the communication terminal 2 and the transmission delay time from the communication terminal 2 to the data communication unit 12 but also includes an HTML file analyzing time of the communication terminal 2.

The cellular phone 2A may include a web browser and may not include software used for measuring a transmission delay time, and the development of new software is not necessary.

Figure 13:
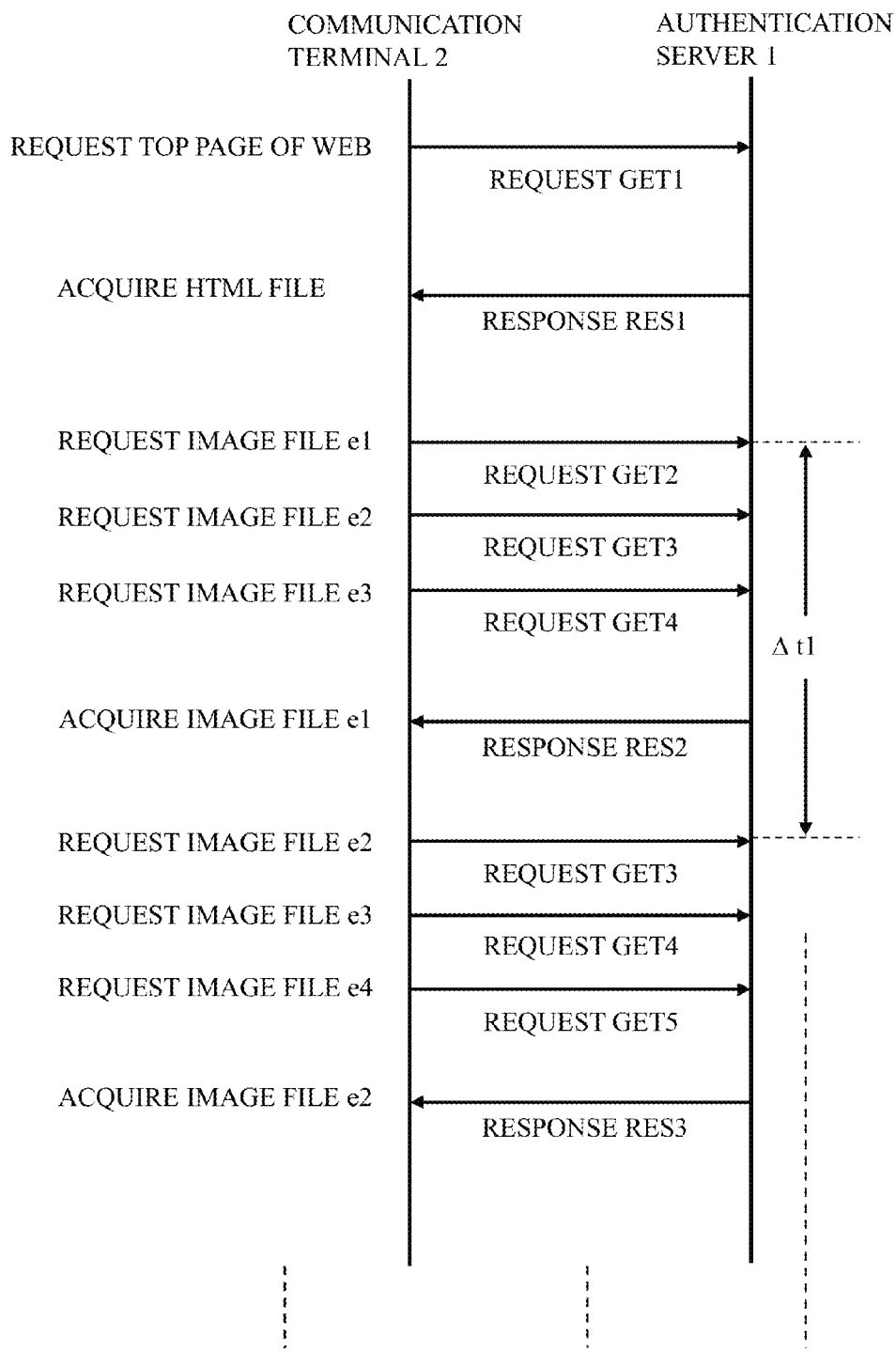
FIG. 13 is a diagram that illustrates a method of measuring a transmission delay time in a case where pipeline processing is performed.

There are cellular phones 2A that perform pipeline processing. The pipeline processing is a process capable of accessing a page at high speed by transmitting request signals altogether. For example, as illustrated in FIG. 13, the communication terminal 2 transmits a request GET2 that is a request signal for the image file e1, a request GET3 that is a request signal for the image file e2, and a request GET4 that is a request signal for the image file e3 altogether. In the case of the cellular phone 2A that performs such pipeline processing, the cellular phone 2A almost simultaneously transmits the requests GET2 and GET3, and thus, a total of the transmission delay times cannot be measured even by measuring a time from the request GET2 to the request GET3. Accordingly, the data communication unit 12 of the authentication server 1 sequentially repeats the reception of one request signal and the transmission of one data element. Then, the transmission delay time measuring unit 13 measures a total of the transmission delay times by measuring a reception interval of each request signal.

For example, when the requests GET2, GET3, and GET4 are received altogether, the data communication unit 12 transmits a response RES2 for the request GET2 to the communication terminal 2, and, thereafter, the data communication unit 12 closes a TCP connection after the transmission of the response RES2. As above, for the requests GET3 and GET4, responses RES3 and RES4 are not transmitted. As a result, after the response RES2 is received, the communication terminal 2 retransmits the request GET3.

The transmission delay time measuring unit 13 measures a time $\Delta t1$ that is a time until the retransmitted request GET3 is received after the request GET2 out of the requests GET2, GET3, and GET4 received altogether is received as a total of a transmission delay time from the data communication unit 12 to the communication terminal 2 and a transmission delay time from the communication terminal 2 to the data communication unit 12.

In order to respond to the cellular phone 2A performing pipeline processing, the data communication unit 12 that has received the request GET1 requesting for the top page of the web may stop the pipeline processing of the communication terminal 2 by transmitting the indication of not responding to the pipeline processing to the communication terminal 2. More specifically, the indication of the HTTP of a specification of HTTP/1.0 or HTTP/0.9 is transmitted to the communication terminal 2. By doing so, as illustrated in FIG. 3, the measurement of a transmission delay time in which the reception of one request signal and the transmission of one data element are sequentially repeated can be performed.

Figure 14:
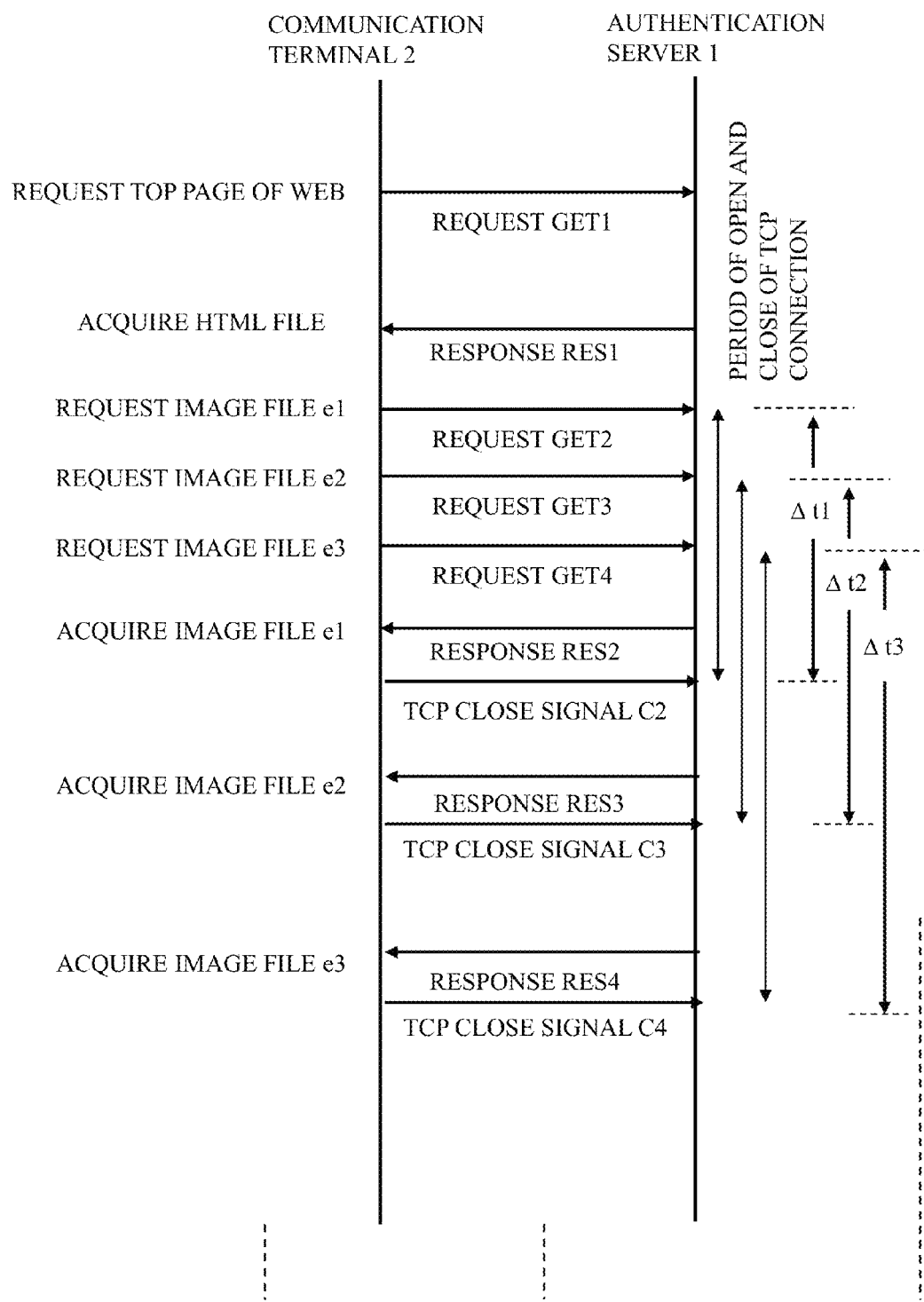
FIG. 14 is a diagram that illustrates another example of the method of measuring a transmission delay time.

FIG. 14 illustrates the other example of the method of measuring a transmission delay time used in the transmission delay time measuring unit 13. When an image file e2 is received, the communication terminal 2 transmits a close signal (FIN) C2 of the TCP to the authentication server 1. In this method, an interval, which is a time until a close signal after the transmission of a data element is received after a request signal is received by the authentication server 1, is measured as a transmission delay time by using the close signal (FIN) of the TCP. For example, the transmission delay time measuring unit 13 measures an interval until the reception of the close signal C2 from the communication terminal 2 after the reception of a request GET2 in the authentication server 1 as a transmission delay time $\Delta t1$.

This method can be applied not to a pipeline type but to a case where a plurality of TCP connections are set up simultaneously. Accordingly, transmission delay times can be simultaneously measured in correspondence with the number of the plurality of connections, and downloading of an image at high speed can be achieved. In a case where the size of the image is large, while a close time for GET transmitted later is delayed, and the transmission delay time is predicted to be lengthened, the transmission delay characteristic between the communication terminal 2 and the authentication server 1 is included and, accordingly, can be used as processing data.

Figure 4:
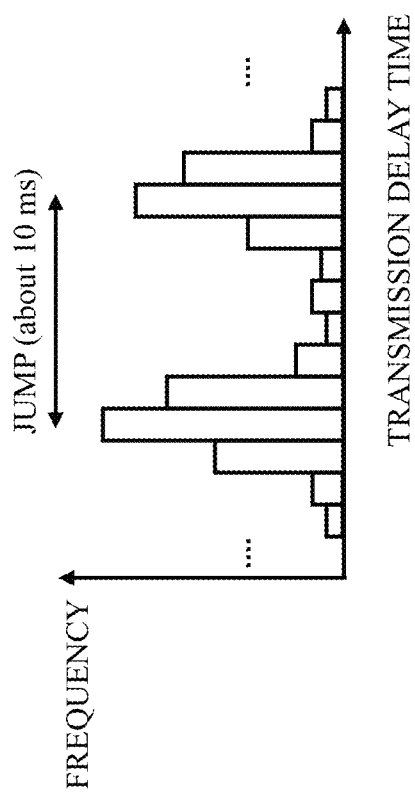
FIG. 4 is a diagram that illustrates a distribution property of a transmission delay time in a case where access authentication is performed from a wireless communication terminal.
Figure 5:
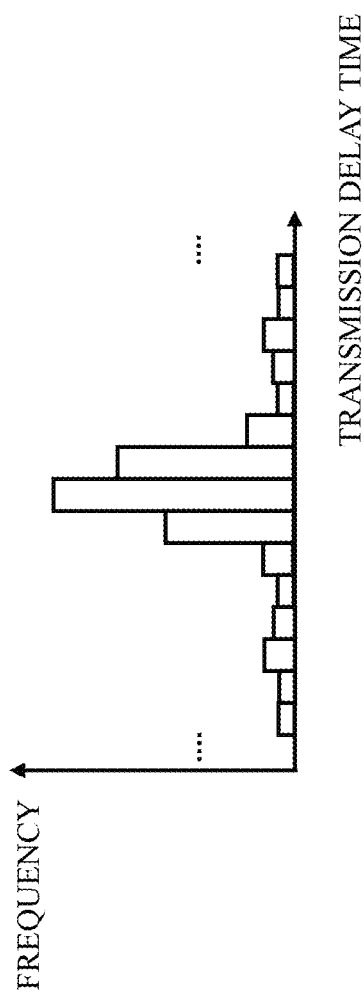
FIG. 5 is a diagram that illustrates a distribution property of a transmission delay time in a case where access authentication is performed from a wired communication terminal.

Next, the transmission delay time distribution property determining step will be described in detail. The distribution property of the transmission delay time is illustrated in FIGS. 4 and 5. The transmission delay time is measured over a plurality of times, and frequencies, at which the transmission delay times in a predetermined range are measured, are measured in the form of a histogram. The distribution property of the transmission delay time at the time of access authentication from a wireless communication terminal is illustrated in FIG. 4. When there is access authentication from a cellular phone 2A connected through a wireless network, the distribution property of the transmission delay time is discrete. In other words, peaks of frequencies appear at intervals of about 10 ms in the transmission delay time. The distribution property of the transmission delay time at the time of access authentication from a wired communication terminal is illustrated in FIG. 5. When there is access authentication from a computer 2B connected through a wired network, the distribution property of the transmission delay time is non-discrete. In other words, only one peak of frequencies appears in the transmission delay time.

In order to determine whether or not the distribution property of the transmission delay time is discrete, the transmission delay time distribution property determining unit 14 performs a process as below. First, frequencies at transmission delay times that are separated from a mode by about multiples of 10 ms are added. Next, the added value is divided by a frequency at the mode, and the divided value is compared with a predetermined threshold. When the divided value is more than the predetermined threshold, it is determined that peaks of the frequency appear at an interval of about 10 ms in the transmission delay time, and it is determined that there is access authentication from a cellular phone 2A connected through a wireless network. When the divided value is less than the predetermined threshold, it is determined that only one peak of the frequency in the transmission delay time appears, and it is determined that there has been access authentication from a computer 2B connected through a wired network. Here, the predetermined threshold is set such that the accuracy of the determination is set to be high.

Figure 6:
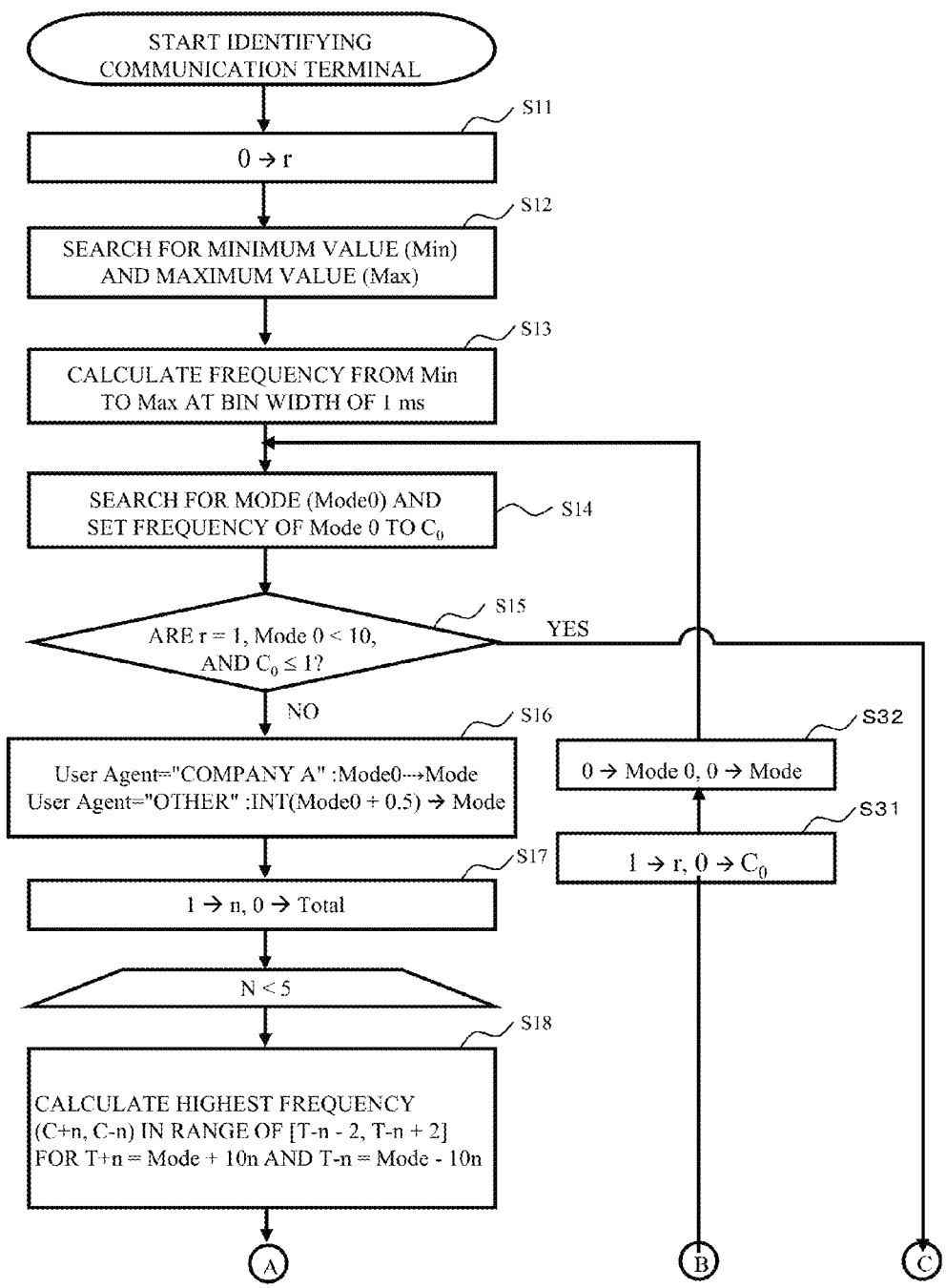
FIG. 6 is a diagram that illustrates a method of identifying a communication terminal.
Figure 7:
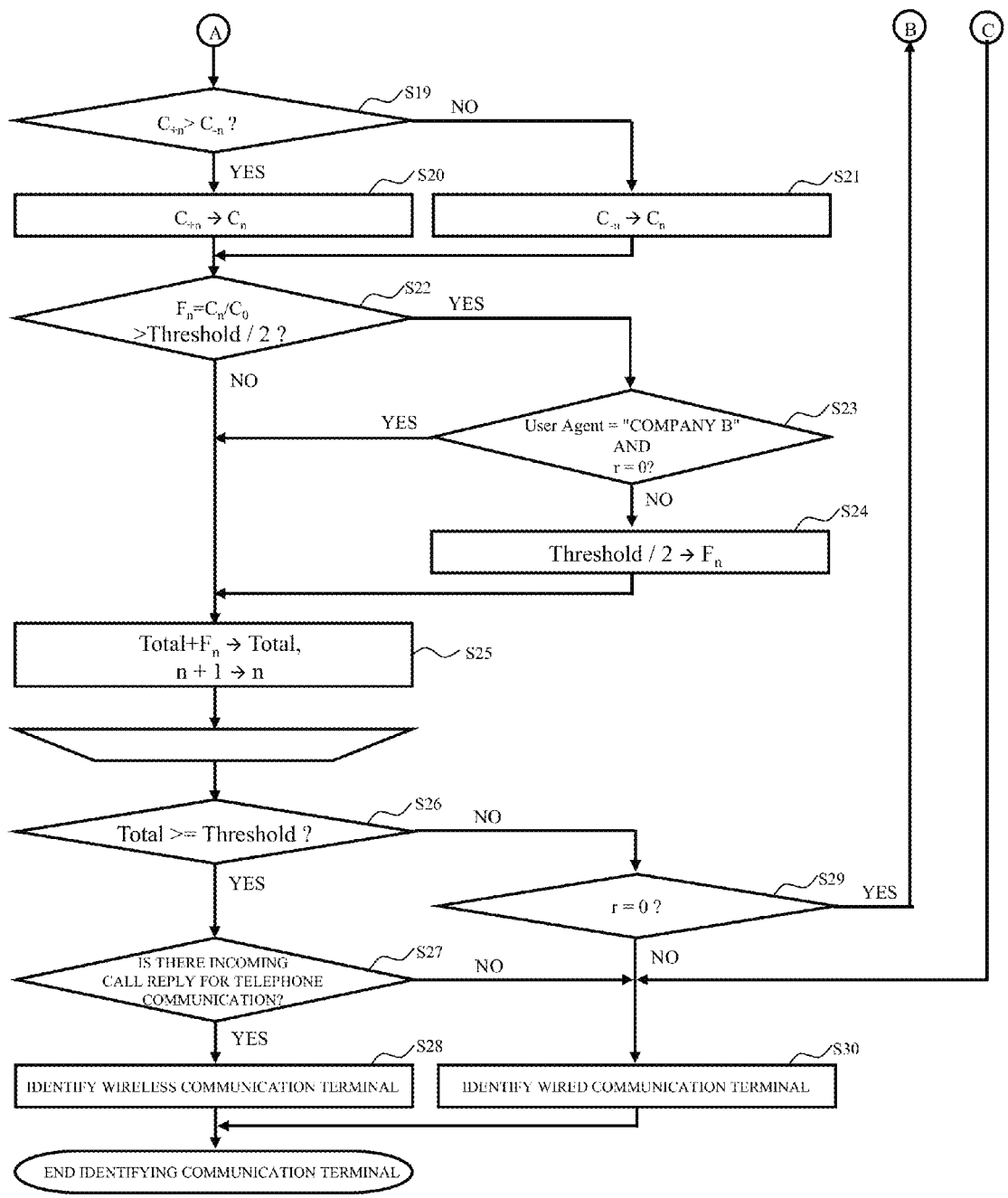
FIG. 7 is a diagram that illustrates the method of identifying a communication terminal.

A method of identifying a communication terminal is illustrated in FIGS. 6 and 7. A total number of times of the process of identifying a communication terminal 2 is arbitrary and is set in accordance with the degree of identification accuracy. First, a parameter r representing the number of times of the process of identifying a communication terminal 2 is reset to zero (Step S11).

A minimum value Min and a maximum value Max of the transmission delay time are searched (Step S12). From the minimum value Min to the maximum value Max, frequencies are calculated with BIN width of 1 ms (Step S13). A mode Mode0 of the transmission delay time is searched, and the frequency at the mode Mode0 is set as $C_0$ (Step S14). The parameter r is reset to zero (No in Step S15), and the process proceeds to Step S16. Step S15 will be described later.

When an access from a wireless communication terminal is authenticated, the transmission delay time is frequently a multiple of 10 ms or is on the vicinity of a multiple of 10 ms. Here, when the mode Mode0 is a multiple of 10 ms, the peak of the frequency in the transmission delay time separated from the mode Mode0 by a multiple of 10 ms may be easily recognized, and a discrete distribution property may be easily recognized. However, when the mode Mode0 is on the vicinity of a multiple of 10 ms, it is difficult to recognize the peak of the frequency in the transmission delay time that is separated from the mode Mode0 by a multiple of 10 ms, and it is difficult to recognize a discrete distribution property.

Thus, as a general rule, the unit digit of the mode Mode0 is rounded off and is set as a new mode Mode. However, there is a User Agent in which there are a few cases where the transmission delay time is a multiple of 10 ms or is on the vicinity of a multiple of 10 ms. The User Agent is assumed to be company A. Thus, when the User Agent is company A, as an exception, a mode Mode0 is set as a new mode Mode, and when the User Agent is a company other than company A, according to the general rule, the unit digit of the mode Mode0 is rounded off to be set as a new mode Mode (Step S16).

Here, the User Agent may make a determination using an ID of a communication terminal 2, a password, an ID unique to a cellular phone company, a telephone number, or the like. However, considering that it is difficult to change the ID unique to a cellular phone company and the telephone number, it is preferable that the User Agent makes the determination using the ID unique to the cellular phone company and the telephone number. In addition, considering that there is a company not assigning an ID unique to the cellular phone company, it is more preferable that the User Agent makes the determination using the telephone number.

A highest frequency on the vicinity of the transmission delay time separated from the mode Mode by a multiple of 10 ms is calculated, and highest frequencies for various multiples are added. The added value is divided by a frequency $C_0$ at the mode Mode0, and a divided value is compared with a predetermined threshold.

When highest frequencies are added for various multiples, the multiple n is set to one, and a total of the highest frequencies is reset to zero (Step S17). For cases where the multiple n is 1, 2, 3, and 4, Steps S18 to S25 are repeated.

For $T_{+n}$=Mode+10n, a highest frequency $C_{+n}$ in the range of $[T_{+n}-2, T_{+n}+2]$ is calculated, and, for $T_{-n}$=Mode−10n, a highest frequency $C_{-n}$ in the range of $[T_{-n}-2, T_{-n}+2]$ is calculated (Step S18). When the highest frequency $C_{+n}$ is more than the highest frequency $C_{-n}$ (Yes in Step S19), the highest frequency $C_n$ is set to the highest frequency $C_{+n}$ (Step S20). When the highest frequency $C_{-n}$ is more than the highest frequency $C_{+n}$ (No in Step S19), the highest frequency $C_n$ is set to the highest frequency $C_{-n}$ (Step S21). Then, as a general rule, the highest frequency $C_n$ is set as an addition target.

Even at the time of access authentication from a wired communication terminal, when the highest frequency $C_n$ is more than a predetermined value, the above-described divided value may be more than a predetermined threshold, and there are cases where the access authentication is misidentified as access authentication from a wireless communication terminal. Accordingly, when the highest frequency $C_n$ is more than the predetermined value, as an exception, frequencies lower than the highest frequency $C_n$ are addition targets.

Even at the time of access authentication from a wireless communication terminal, there is a User Agent in which only one or two peaks in the transmission delay time appear, and, when frequencies lower than the highest frequency $C_n$ are addition targets, there are cases where the access authentication is misidentified as access authentication from a wired communication terminal. The User Agent is assumed to be company B. Thus, when the User Agent is company B, in accordance with the general rule, the highest frequency $C_n$ is an addition target.

$F_n = C_n/C_0$ is calculated. When $F_n$ is less than a half of a predetermined threshold/2 (No in Step S22), in accordance with the general rule, as a total of highest frequencies, a value acquired by adding $F_n$ to the current value is set (Step S25). When $F_n$ is more than the half of the predetermined threshold/2 (Yes in Step S22), it is determined whether it is satisfied that the User Agent is company B, and the parameter r is zero (hereinafter, referred to as condition X) (Step S23). In a case where condition X is satisfied (Yes in Step S23), in accordance with the general rule, as a total of highest frequencies, a value acquired by adding $F_n$ to the current value is set (Step S25). When condition X is not satisfied (No in Step S23), as an exception, a half of the threshold/2 is set as new $F_n$ (Step S24), and, as a total of highest frequencies, a value acquired by adding new $F_n$ to the current value is set (Step S25).

For cases where the multiple n is 1, 2, 3, and 4, Steps S18 to S25 are repeated, and it is determined whether or not the total of highest frequencies is more than a predetermined threshold (Step S26). When the total of highest frequencies is more than the predetermined threshold (Yes in Step S26), as the general rule, the access authentication is identified as being from a wireless communication terminal (Step S28). When the total of highest frequencies is less than the predetermined threshold (No in Step S26), as the general rule, the access authentication is identified as being from a wired communication terminal (Step S30). Here, the predetermined threshold may be set in accordance with the User Agent.

Even at the time of access authentication from a wired communication terminal, when the access authentication is from a data module used for a computer 2B, a total of highest frequencies may be more than the predetermined threshold, and accordingly, there are cases where the access authentication is misidentified as access authentication from a wireless communication terminal. However, while a cellular phone 2A can use a telephone line, the data module used for a computer 2B cannot use a telephone line, and accordingly, by using this, access authentication from a cellular phone 2A and access authentication from the data module used for a computer 2B can be discriminated from each other.

In other words, the data communication unit 12 performs telephone communication with the communication terminal 2. Here, this telephone communication transmits not only human speech data but also all the data. Then, when an incoming call reply has been made for the telephone communication from the communication terminal 2, the content access authentication unit 15 recognizes the communication terminal 2 as a cellular phone 2A using a telephone line and approves an access to contents, and, when an incoming call reply has not been made for the telephone communication from the communication terminal 2, the content access authentication unit 15 recognizes the communication terminal 2 as a data module of a computer 2B not using a telephone line and denies an access to contents. Here, the authentication server 1 may store data of telephone numbers of communication terminals 2. The incoming call reply may be returned by the cellular phone 2A detecting user's speech, or the incoming call reply may be returned by the cellular phone 2A outputting automatic speech using software installed thereto. In addition, the cellular phone 2A may return the incoming call reply by detecting user's pressing of a reception button, or the cellular phone 2A may return the incoming call reply by transmitting a signal using software installed thereto.

When a total of the highest frequencies is more than the predetermined threshold (Yes in Step S26), and there is an incoming call reply for the telephone communication (Yes in Step S27), as the general rule, the access authentication is identified as being from a cellular phone 2A (Step S28). When a total of the highest frequencies is more than the predetermined threshold (Yes in Step S26), and there is no incoming call reply (No in Step S27), as an exception, the access authentication is identified as being from a data module of a computer 2B (Step S30).

Even at the time of access authentication from a wireless communication terminal, there are cases where a peak of frequencies appears in a transmission delay time of several ms or ten and several ms, and, in such cases, when the transmission delay time is set as a mode Mode0, it is difficult to recognize a discrete distribution property. Thus, a mode Mode0 other than the mode Mode0 that has been searched first is searched again, and re-identification is performed.

When a total of the highest frequencies is less than the predetermined threshold (No in Step S26), and the parameter r is not zero (No in Step S29), as the general rule, the access authentication is identified as being from a wired communication terminal (Step S30). When a total of the highest frequencies is less than the predetermined threshold (No in Step S26), and the parameter r is zero (Yes in Step S29), as an exception, the process proceeds to Steps S31 and S32 so as to perform re-identification.

In Step S31, the parameter r representing the number of times of performing the identification process of the communication terminal 2 is set to one, and the frequency $C_0$ at the mode Mode0, which has been searched first, is set to zero. In Step S32, the mode Mode0 and the mode Mode are reset to zero. After Steps S31 and S32 are performed, the process proceeds to Steps S14 and S15. In Step S15, it is determined whether it is satisfied that the parameter r is one, the mode Mode0 is less than 10 ms, and the frequency $C_0$ at the mode Mode0 is one or less (hereinafter, referred to as condition Y). In a case where condition Y is satisfied (Yes in Step S15), the access authentication is identified as being from a wired communication terminal (Step S30). In a case where condition Y is not satisfied (No in Step S15), the process proceeds to Step S16. As above, access authentication from a wireless communication terminal in which a peak of frequencies appears at a transmission delay time of several ms or ten and several ms can be discriminated from access authentication from a wired communication terminal.

Figure 8:
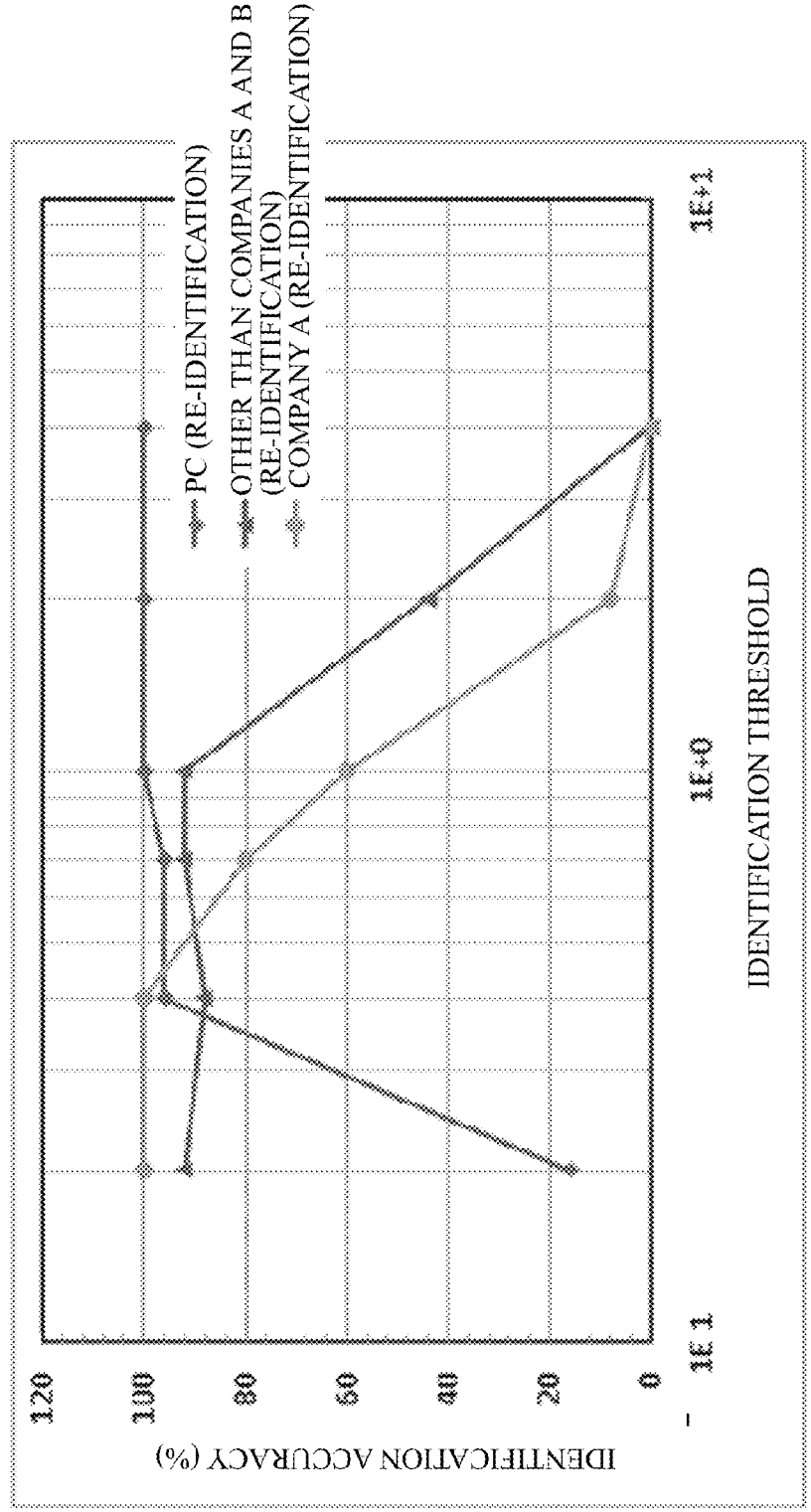
FIG. 8 is a diagram that illustrates the relation between an identification threshold and identification accuracy.

The relation between an identification threshold and identification accuracy is illustrated in FIG. 8. The horizontal axis represents a predetermined threshold, and the vertical axis represents the identification accuracy. A rectangular data point represents the identification accuracy of access authentication from a computer 2B, a triangular data point represents the identification accuracy of access authentication from a cellular phone 2A of a company other than companies A and B, and a circular data point represents the identification accuracy of access authentication from a cellular phone 2A of company A. Any one of the data points is in consideration of re-identification.

As the predetermined threshold becomes larger, it is more difficult for a total of highest frequencies to exceed the predetermined threshold (No in Step S26). Accordingly, while there are a few cases where access authentication from a wired communication terminal is misidentified as access authentication from a wireless communication terminal, there are many cases where access authentication from a wireless communication terminal is misidentified as access authentication from a wired communication terminal.

As the predetermined threshold becomes smaller, it is easier for a total of highest frequencies to exceed the predetermined threshold (Yes in Step S26). Accordingly, while there are a few cases where access authentication from a wireless communication terminal is misidentified as access authentication from a wired communication terminal, there are many cases where access authentication from a wired communication terminal is misidentified as access authentication from a wireless communication terminal.

Thus, it is preferable that the predetermined threshold is set to a value that is not too large and is not too small. More specifically, in the case illustrated in FIG. 8, it is preferable that the predetermined threshold is set to a value of about 0.4.

In this embodiment, when a total of highest frequencies is more than the predetermined threshold, it is identified that there is access authentication from a wireless communication terminal, and, when a total of highest frequencies is less than the predetermined threshold, it is identified that there is access authentication from a wired communication terminal. In the other embodiment, as a total of highest frequencies is further more than the predetermined threshold, it may be determined that the probability of being access authentication from a wireless communication terminal is higher, and, as the total of highest frequencies is further less than the predetermined threshold, it may be determined that the probability of being access authentication from a wired communication terminal is higher.

In the other embodiment, in order to further improve the identification accuracy, identification elements such as the ID of a communication terminal 2, a unique ID generated within the network of the cellular phone company, the password of the communication terminal 2, and positional information of the communication terminal 2 may be used in a combined manner together with the distribution property of the transmission delay time and the incoming call reply to the telephone communication. By employing this embodiment, when it is determined that access authentication from a wireless communication terminal is performed with a considerably high probability, it may be determined that access authentication from a wireless communication terminal is assuredly performed in a case where a few number of identification elements is satisfied. By employing this embodiment, when it is determined that access authentication from a wireless communication terminal is performed with a slightly low probability, it may be determined that access authentication from a wireless communication terminal is assuredly performed for the first time in a case where a large number of identification elements are satisfied.

In this embodiment, the authentication server 1 stores contents in the content storing unit 11. In the other embodiment, the authentication server 1 may not store contents, and a content server other than the authentication server 1 may store contents. In such a case, the data communication unit 12 may notify the cellular phone 2A of the approval of an access to contents and supplies the contents stored in the content server other than the authentication server 1 to the cellular phone 2A.

In this embodiment, the cellular phone 2A or the computer 2B issues an access request and is notified whether an access can be made. In the other embodiment, a device other than the cellular phone 2A may issue an access request and be approved of an access approval. However, in both this embodiment and the other embodiment, it is not changed that the cellular phone 2A performs access authentication. In other words, in the other embodiment, the other device issues an access request, the authentication server 1 issues an authentication request to the cellular phone 2A, the cellular phone 2A performs access authentication, and the authentication server 1 notifies the other device of an access approval and supplies contents. Here, the authentication server 1 may only supply contents instead of performing access approval. In such a case, the authentication server 1 stores information of the other device and information of the cellular phone 2A in association with each other. In addition, the other device may be connected through a wireless network or wired network.

(Embodiment 2)

In an authentication method by an authentication server according to this embodiment, telephone communication is used in the content access authentication step described in Embodiment 1. Accordingly, before the content access authentication step, the data communication unit 12 illustrated in FIG. 1 performs telephone communication with the communication terminal. Then, in the content access authentication step, the authentication server according to this embodiment operates as below.

After the distribution property of the transmission delay time has been determined as being discrete, the content access authentication unit 15 approves an access to contents when the distribution property of the transmission delay time in the telephone communication changes. On the other hand, when the distribution property of the transmission delay time has been determined as being discrete, and then the distribution property of the transmission delay time in the telephone communication does not change, the content access authentication unit 15 denies an access to contents.

For example, in Step S27 illustrated in FIG. 7, instead of determining whether or not there is an incoming call reply, it is determined whether the distribution property of the transmission delay time has been changed. In a case where the communication terminal is a cellular phone 2A, when telephone communication is performed, the transmission delay time increases temporarily or continuously, or the communication for performing authentication is interrupted in the communication terminal. In that case, there is a change of increasing the distribution of a long transmission delay time or decreasing the distribution of the transmission delay time as a whole. On the other hand, in a case where the communication terminal is a computer 2B, although when telephone communication is performed, the transmission delay time does not increase temporarily or continuously, or the communication for performing authentication is not interrupted in the communication terminal. Accordingly, by detecting a change in the distribution property of the transmission delay time at the time of performing telephone communication, it can be determined whether the communication terminal 200 is a cellular phone 2A or the computer 2B. Then, in a case where the distribution property has been changed, it is determined that the access authentication is from a cellular phone 2A (Step S28), and, in a case where the distribution property has not been changed, the process proceeds to Step S30.

In addition, in Step S27 illustrated in FIG. 7, in addition to the determination whether there is an incoming call reply, it may be determined whether or not the distribution property of the transmission delay time has been changed. In this case, in a case where there is an incoming call reply, and the distribution property has been changed, the process proceeds to Step S28, and, in a case where there is no incoming call reply, and the distribution property has not been changed, the access authentication is identified as being from a data module of a computer 2B (Step S30). As a result, it can be determined further more accurately whether the communication terminal is a cellular phone 2A or a computer 2B.

(Embodiment 3)

Figure 9:
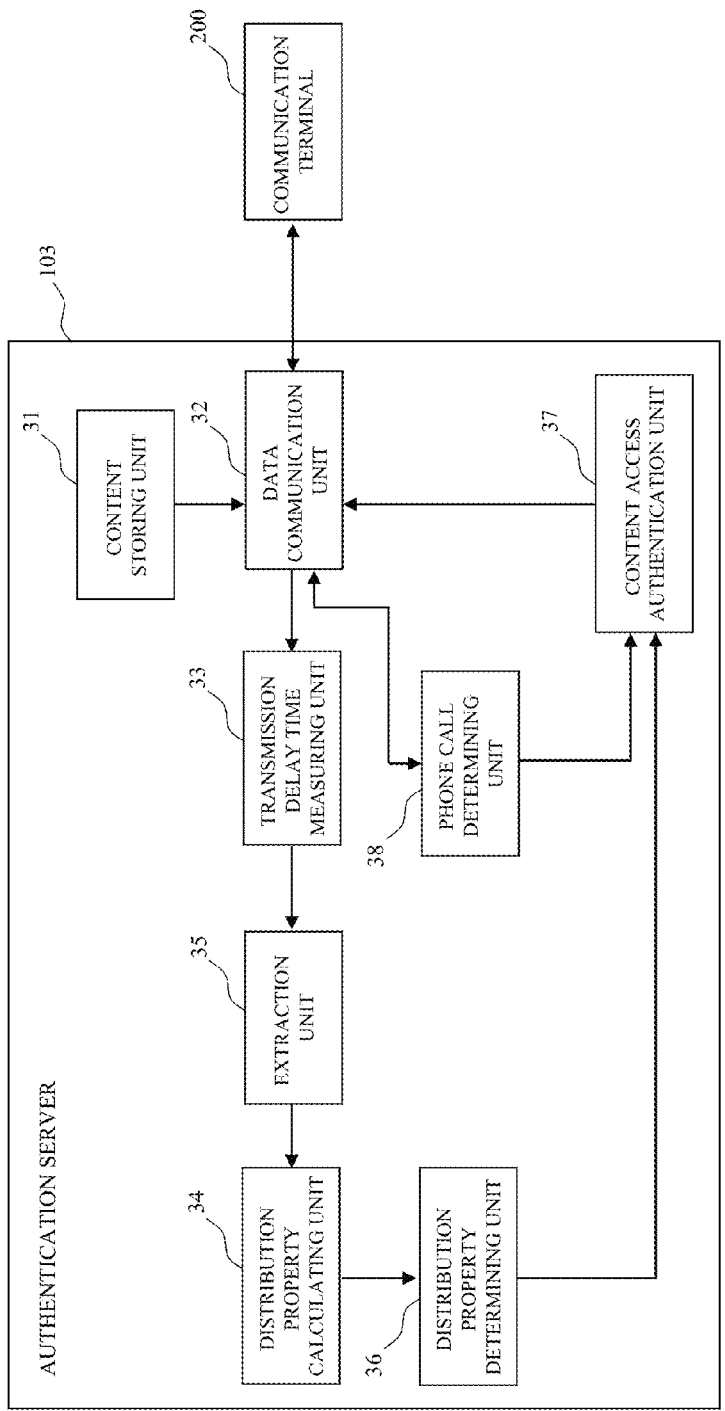
FIG. 9 illustrates an example of a content providing system according to Embodiment 3.

FIG. 9 illustrates an example of a content providing system according to Embodiment 3. When contents are supplied to a communication terminal 200, an authentication server 103 determines whether the communication terminal 200 is a regular smartphone or a non-regular smartphone that is pretended by a computer. Then, in a case where the communication terminal 200 is a regular smartphone, the authentication server 103 supplies contents thereto, and, in a case where the communication terminal 200 is a non-regular smartphone, the authentication server 103 does not supply contents thereto.

The authentication server 103 includes a content storing unit 31, a data communication unit 32, a transmission delay time measuring unit 33, an extraction unit 35, a distribution property calculating unit 34, a distribution property determining unit 36, a content access authentication unit 37, and a phone call determining unit 38. The content storing unit 31 stores contents to be supplied to the communication terminal 200.

FIG. 2 illustrates an example of an authentication method by the authentication server according to Embodiment 3. The authentication method by the authentication server according to this embodiment sequentially includes an access authentication receiving step, a distribution property determining step, and a content access authentication step. In the access authentication receiving step, the data communication unit 32 receives authentication for accessing contents that is performed by the communication terminal 200 (reference sign S1 illustrated in FIG. 2). In the distribution property determining step, Steps S2 to S4 are performed. In the content access authentication step, Steps S5 to S8 are performed.

Here, the distribution property determining step will be described.

Figure 10:
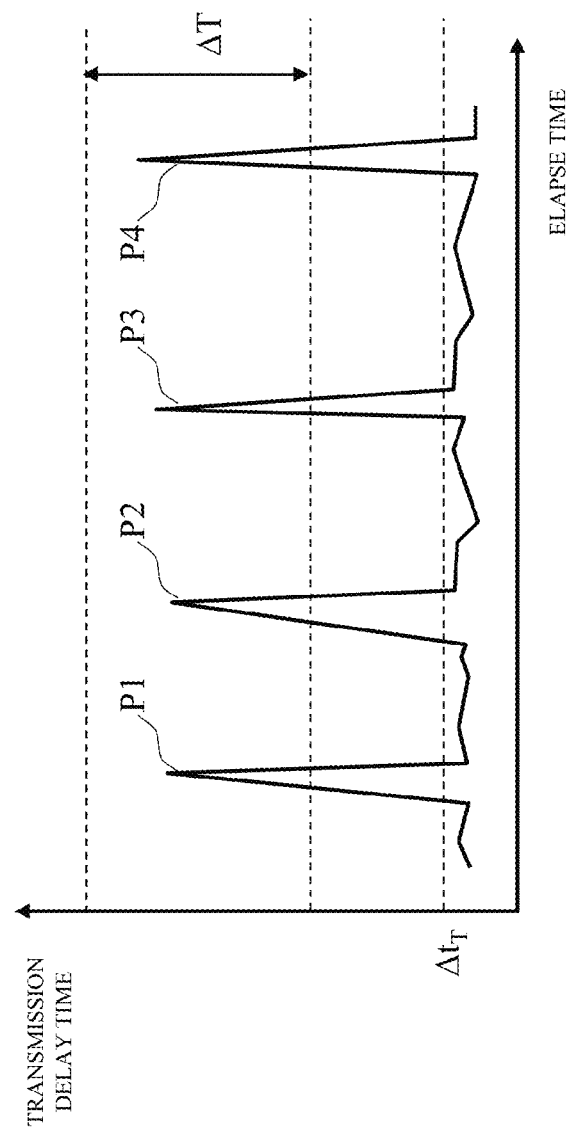
FIG. 10 is an example of changes in the transmission delay time in a case where a communication terminal 200 is a regular smartphone.

The data communication unit 32 performs data communication with the communication terminal 200 performing authentication used for accessing contents. The transmission delay time measuring unit 33 measures a transmission delay time between the data communication unit 32 and the communication terminal 200 over a plurality of times (reference sign S2 illustrated in FIG. 2). As a result, in a case where the communication terminal 200 is a regular smartphone, as illustrated in FIG. 10, sharp peaks P1 to P4 appear in the transmission delay time.

The extraction unit 35 accumulates transmission delay times measured by the transmission delay time measuring unit 33, detects transmission delay times that are peak values of peaks P1 to P4, and extracts transmission delay times within a predetermined range ΔT including the peak values. Here, the predetermined range ΔT is an arbitrary range that includes a plurality of peak values exceeding a threshold $\Delta t_T$ from which a peak of the transmission delay time and the background can be separated.

Then, the distribution property calculating unit 34 accumulates transmission delay times extracted by the extraction unit 35 and calculates a distribution property of the transmission delay time. In that case, in a case where the communication terminal 200 is a regular smartphone, a discrete distribution as illustrated in FIG. 4 is formed, and, in a case where the communication terminal 200 is a non-regular smartphone, a non-discrete distribution as illustrated in FIG. 5 is formed.

The distribution property determining unit 36 determines whether or not the distribution property calculated by the distribution property calculating unit 34 is discrete (reference sign S4 illustrated in FIG. 2). As a result, it can be determined whether the communication terminal 200 is a regular smartphone or a non-regular smartphone.

Hereinafter, the content access authentication step will be described.

When the distribution property determining unit 36 has determined distribution property as being discrete (Yes in Step S4), the content access authentication unit 37 recognizes the access authentication from a regular smartphone (reference sign S5 illustrated in FIG. 2) and approves an access to contents (reference sign S6 illustrated in FIG. 2). Then, the data communication unit 32 notifies the communication terminal 200 of the approval of the access to contents and supplies contents stored in the content storing unit 31 to the communication terminal 200. Here, the data communication unit 32 may supply only the contents stored in the content storing unit 31 instead of the approval of the access to contents to the communication terminal 200.

On the other hand, when the distribution property determining unit 36 determines the distribution property as being non-discrete ("No" in reference sign S4 illustrated in FIG. 2), the content access authentication unit 37 recognizes the access authentication as access authentication from a non-regular smartphone (reference sign S7 illustrated in FIG. 2) and denies the access to contents (reference sign S8 illustrated in FIG. 2). Then, the data communication unit 32 notifies the communication terminal 200 of the denial of the access to contents without transmitting contents stored in the content storing unit 31 to the communication terminal 200.

It can be determined securely and accurately whether the communication terminal 200 is a regular smartphone or a non-regular smartphone when an access to contents of the authentication server 103 is limited to a user using a regular smartphone. Since the above-described determination is made not by the communication terminal 200 but by the authentication server 103, there is no concern that the distribution property is disguised by a computer.

In this embodiment, a phone call determining step (not illustrated in the figure) may be included. The phone call determining step is performed between the access authentication receiving step and the distribution property determining step and simultaneously with the distribution property determining step or between the distribution property determining step and the content access authentication step.

In the phone call determining step, a content providing system according to this embodiment operates as below. The data communication unit 32 performs telephone communication with the communication terminal. The phone call determining unit 38 determines whether or not the data communication unit 32 has received an incoming call reply from the communication terminal 200. By receiving the incoming call reply from the communication terminal 200, it can be checked whether the communication terminal 200 is a terminal having a telephone function such as a cellular phone or a smartphone. In a case where an incoming call reply has not been received from the communication terminal 200, it can be checked that the communication terminal 200 is a pretended terminal configured not to include a telephone function such as a computer.

In a case where the phone call determining step is included, in the content access authentication step, the content providing system according to this embodiment operates as below.

In a case where the distribution property determining unit 36 determines discreteness, and the phone call determining unit 38 determines that an incoming call reply has been received, the content access authentication unit 37 approves an access to contents. Then, the data communication unit 32 notifies the communication terminal 200 of the approval of the access to contents and supplies contents stored in the content storing unit 31 to the communication terminal 200.

On the other hand, in a case where the distribution property determining unit 36 determines non-discreteness, or the phone call determining unit 38 determines that an incoming call reply has not been received, the content access authentication unit 37 denies the access to contents. Then, the data communication unit 32 notifies the communication terminal 200 of denial of the access to contents without transmitting the contents stored in the content storing unit 31 to the communication terminal 200.

Next, the measurement of the transmission delay time in Step S2 will be described in detail. The data communication unit 32 transmits an HTML file including a plurality of data elements to the communication terminal 200 and receives request signals requesting for data element from the communication terminal 200. By measuring reception intervals of the request signals requesting for data elements from the communication terminal 200, the transmission delay time measuring unit 33 measures a total of a transmission delay time from the data communication unit 32 to the communication terminal 200 and a transmission delay time from the communication terminal 200 to the data communication unit 32. Here, a data element, for example, is an image file.

FIG. 3 illustrates an example of the method of measuring a transmission delay time in a case where the data element is an image file.

The communication terminal 200 requests a top page of the web by transmitting a request GET1 to the authentication server 103. The data communication unit 32 transmits a response RES1 to the communication terminal 200 and supplies an HTML file. The communication terminal 200 requests a plurality of image files e1, e2, e3, . . . included in the HTML file by analyzing the HTML file.

The communication terminal 200 requests an image file e1 by transmitting a request GET2 to the authentication server 103. The data communication unit 32 supplies the image file e1 by transmitting a response RES2 to the communication terminal 200. The communication terminal 200 requests an image file e2 by transmitting a request GET3 to the authentication server 103. The data communication unit 32 supplies the image file e2 by transmitting a response RES3 to the communication terminal 200. The communication terminal 200 requests an image file e3 by transmitting a request GET4 to the authentication server 103. The data communication unit 32 supplies the image file e3 by transmitting a response RES4 to the communication terminal 200. The above-described process is repeated until all the image files included in the HTML file are acquired by the communication terminal 200.

Figure 11:
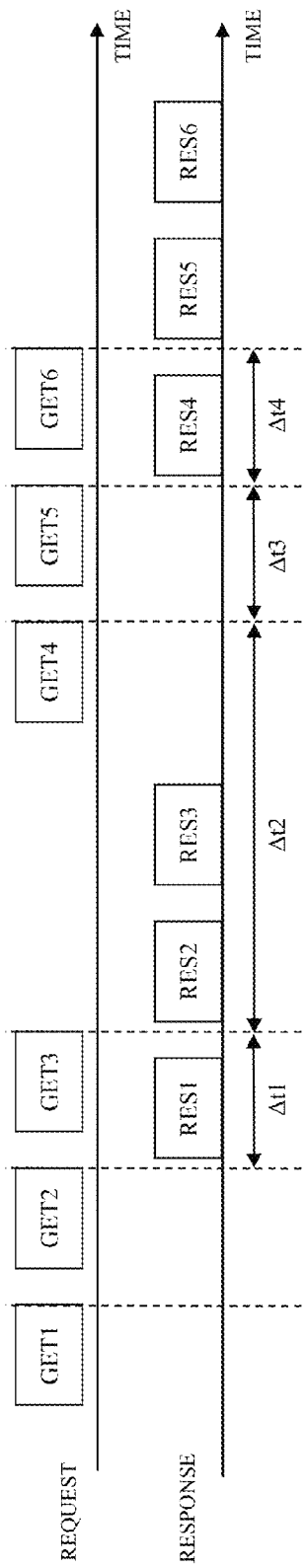
FIG. 11 illustrates an example of a method of calculating a transmission delay time.

FIG. 11 illustrates an example of the method of measuring a transmission delay time. The transmission delay time measuring unit 33 measures a time $\Delta t1$ that is a time until a next request GET3 is received from the communication terminal 200 after the request GET2 is received from the communication terminal 200 as a transmission delay time from the data communication unit 32 to the communication terminal 200. The transmission delay time measuring unit 33 measures a time $\Delta t2$ that is a time until a next request GET4 is received from the communication terminal 200 after the request GET3 is received from the communication terminal 200 as a transmission delay time from the data communication unit 32 to the communication terminal 200. The above-described process is repeated until all the image files included in the HTML file are supplied by the data communication unit 32. As a result, transmission delay times illustrated in FIG. 10 are acquired.

Here, the communication terminal 200 may include a web browser and may not include software used for measuring a transmission delay time, and the development of new software is unnecessary.

In addition, the responding to the cellular phone 2A performing the pipeline processing is as described in Embodiment 1.

Next, the transmission delay time distribution property determining step will be described in detail with reference to FIGS. 4 and 5. The transmission delay time is measured over a plurality of times, and frequencies, at which the transmission delay times in a predetermined range are measured, are measured in the form of a histogram. When there is access authentication from a communication terminal 200 connected through a wireless network, as illustrated in FIG. 4, the distribution property of the transmission delay time is discrete. For example, peaks of frequencies appear at intervals of about 10 ms in the transmission delay time. When there is access authentication from a communication terminal 200 connected through a wired network, which is a non-regular smartphone, as illustrated in FIG. 5, the distribution property of the transmission delay time is non-discrete. In other words, only one peak of frequencies in the transmission delay time appears.

In order to determine whether or not the distribution property of the transmission delay time is discrete, the distribution property determining unit 34 performs a process as below. First, frequencies at transmission delay times that are separated from a mode by about multiples of 10 ms are added. Next, the added value is divided by a frequency at the mode, and the divided value is compared with a predetermined threshold. When the divided value is more than the predetermined threshold, it is determined that peaks of the frequency appear at an interval of about 10 ms in the transmission delay time, and it is determined that there is access authentication from a smartphone connected through a wireless network. When the divided value is less than the predetermined threshold, it is determined that only one peak of the frequency in the transmission delay time appears, and it is determined that there is access authentication from a non-regular smartphone. Here, the predetermined threshold is set such that the accuracy of the determination is set to be high.

FIGS. 6 and 7 illustrate an example of the method of identifying a communication terminal. A total number of times of the process of identifying a communication terminal 200 is arbitrary and is set depending on the degree of high/low of identification accuracy. First, the parameter r representing the number of times of the process of identifying a communication terminal 200 is reset to zero (Step S11).

A minimum value Min and a maximum value Max of the transmission delay time are searched (Step S12). From the minimum value Min to the maximum value Max, frequencies are calculated with a frequency width of 1 ms (Step S13). A mode Mode0 of the transmission delay time is searched, and the frequency at the mode Mode0 is set as $C_0$ (Step S14). The parameter r is reset to zero (No in Step S15), and the process proceeds to Step S16. Step S15 will be described later.

When an access from a regular smartphone is authenticated, the transmission delay time is frequently a multiple of 10 ms or is on the vicinity of a multiple of 10 ms. Here, when the mode Mode0 is a multiple of 10 ms, the peak of the frequency in the transmission delay time separated from the mode Mode0 by a multiple of 10 ms may be easily recognized, and a discrete distribution property may be easily recognized. However, when the mode Mode0 is on the vicinity of a multiple of 10 ms, it is difficult to recognize the peak of the frequency in the transmission delay time that is separated from the mode Mode0 by a multiple of 10 ms, and it is difficult to recognize a discrete distribution property.

Thus, as a general rule, the unit digit of the mode Mode0 is rounded off and is set as a new mode Mode. However, there is a User Agent in which there are a few cases where the transmission delay time is a multiple of 10 ms or is on the vicinity of a multiple of 10 ms. The User Agent is assumed to be company A. Thus, when the User Agent is company A, as an exception, a mode Mode0 is set as a new mode Mode, and, when the User Agent is a company other than company A, according to the general rule, the unit digit of the mode Mode0 is rounded off to be set as a new mode Mode (Step S16).

Here, the User Agent may make a determination using an ID of a communication terminal 200, a password, an ID unique to a cellular phone company, a telephone number, or the like. However, considering that it is difficult to change the ID unique to a cellular phone company and the telephone number, it is preferable that the User Agent makes the determination using the ID unique to the cellular phone company and the telephone number. In addition, considering that there is a company not assigning an ID unique to the cellular phone company, it is more preferable that the User Agent makes the determination using the telephone number.

A highest frequency on the vicinity of the transmission delay time separated from the mode Mode by a multiple of 10 ms is calculated, and highest frequencies for various multiples are added. The added value is divided by a frequency $C_0$ at the mode Mode0, and a divided value is compared with a predetermined threshold.

When highest frequencies are added for various multiples, the multiple n is set to one, and a total of the highest frequencies is reset to zero (Step S17). For cases where the multiple n is 1, 2, 3, and 4, Steps S18 to S25 are repeated.

For $T_{+n}$=Mode+10n, a highest frequency $C_{+n}$ in the range of $[T_{+n}-2, T_{+n}+2]$ is calculated, and, for $T_{-n}$=Mode−10n, a highest frequency $C_{-n}$ in the range of $[T_{-n}-2, T_{-n}+2]$ is calculated (Step S18). When the highest frequency $C_{+n}$ is more than the highest frequency $C_{-n}$ (Yes in Step S19), the highest frequency $C_n$ is set to the highest frequency $C_{+n}$ (Step S20). When the highest frequency $C_{-n}$ is more than the highest frequency $C_{+n}$ (No in Step S19), the highest frequency $C_n$ is set to the highest frequency $C_{-n}$ (Step S21). Then, as a general rule, the highest frequency $C_n$ is set as an addition target.

Even at the time of access authentication from a non-regular smartphone, when the highest frequency $C_n$ is more than a predetermined value, the above-described divided value may be more than a predetermined threshold, and there are cases where the access authentication is misidentified as access authentication from a regular smartphone. Accordingly, when the highest frequency $C_n$ is more than the predetermined value, as an exception, frequencies lower than the highest frequency $C_n$ are set as addition targets.

Even at the time of access authentication from a regular smartphone, there is a User Agent in which only one or two peaks of the frequencies in the transmission delay time appear, and, when frequencies lower than the highest frequency $C_n$ are addition targets, there are cases where the access authentication is misidentified as access authentication from a non-regular smartphone. The User Agent is assumed to be company B. Thus, when the User Agent is company B, in accordance with the general rule, the highest frequency $C_n$ is set as an addition target.

$F_n=C_n/C_0$ is calculated. When $F_n$ is less than a half of a predetermined threshold/2 (No in Step S22), in accordance with the general rule, as a total of highest frequencies, a value acquired by adding $F_n$ to the current value is set (Step S25). When $F_n$ is more than the half of the predetermined threshold/2 (Yes in Step S22), it is determined whether it is satisfied that the User Agent is company B, and the parameter r is zero (hereinafter, referred to as condition X) (Step S23). In a case where condition X is satisfied (Yes in Step S23), in accordance with the general rule, as a total of highest frequencies, a value acquired by adding $F_n$ to the current value is set (Step S25). When condition X is not satisfied (No in Step S23), as an exception, a half of the predetermined threshold/2 is set as new $F_n$ (Step S24), and, as a total of highest frequencies, a value acquired by adding new $F_n$ to the current value is set (Step S25).

For cases where the multiple n is 1, 2, 3, and 4, Steps S18 to S25 are repeated, and it is determined whether or not the total of highest frequencies is more than a predetermined threshold (Step S26). When the total of highest frequencies is more than the predetermined threshold (Yes in Step S26), as the general rule, the access authentication is identified as being from a regular smartphone (Step S28). When the total of highest frequencies is less than the predetermined threshold (No in Step S26), as the general rule, the access authentication is identified as being from a non-regular smartphone (Step S30). Here, the predetermined threshold may be set in accordance with the User Agent.

Even at the time of access authentication from a non-regular smartphone, when the access authentication is from a data module used for a computer, a total of highest frequencies may be more than the predetermined threshold, and accordingly, there are cases where the access authentication is misidentified as access authentication from a regular smartphone. However, while, in a case where the communication terminal 200 is a smartphone, a telephone line can be used, in a case where the communication terminal 200 is a data module used for a computer, a telephone line cannot be used, and accordingly, by using this, access authentication from a smartphone and access authentication from a data module used for a computer can be discriminated from each other.

In other words, the data communication unit 32 performs telephone communication with the communication terminal 200. Here, this telephone communication transmits not only human speech data but also all the data including. Then, when an incoming call reply has been made for the telephone communication from the communication terminal 200, the content access authentication unit 15 recognizes the communication terminal 200 as a communication terminal 200 using a telephone line and approves an access to contents, and, when an incoming call reply has not been made for the telephone communication from the communication terminal 200, the content access authentication unit 15 recognizes the communication terminal 200 as a data module of a computer not using a telephone line and denies an access to contents. Here, the authentication server 103 may store data of telephone numbers of communication terminals 200. The incoming call reply may be returned by the communication terminal 200 detecting user's speech, or the incoming call reply may be returned by the communication terminal 200 outputting automatic speech using software installed thereto. In addition, the communication terminal 200 may return the incoming call reply by detecting user's pressing of a reception button, or the communication terminal 200 may return the incoming call reply by transmitting a signal using software installed thereto.

When a total of the highest frequencies is more than the predetermined threshold (Yes in Step S26), and there is an incoming call reply for the telephone communication (Yes in Step S27), as the general rule, the access authentication is identified as being from a smartphone (Step S28). When a total of the highest frequencies is more than the predetermined threshold (Yes in Step S26), and there is no incoming call reply for the telephone communication (No in Step S27), as an exception, the access authentication is identified as being from a data module of a computer (Step S30).

Even at the time of access authentication from a regular smartphone, there are cases where a peak of frequencies appears in a transmission delay time of several ms or ten and several ms, and, in such cases, when the transmission delay time is set as a mode Mode0, it is difficult to recognize a discrete distribution property. Thus, a mode Mode0 other than the mode Mode0 that has been searched first is searched again, and re-identification is performed.

When a total of the highest frequencies is less than the predetermined threshold (No in Step S26), and the parameter r is not zero (No in Step S29), as the general rule, the access authentication is identified as being from a non-regular smartphone (Step S30). When a total of the highest frequencies is less than the predetermined threshold (No in Step S26), and the parameter r is zero (Yes in Step S29), as an exception, the process proceeds to Steps S31 and S32 so as to perform re-identification.

In Step S31, the parameter r representing the number of times of performing the identification process of the communication terminal 200 is set to one, and the frequency $C_0$ at the mode Mode0, which has been searched first, is set to zero. In Step S32, the mode Mode0 and the mode Mode are reset to zero. After Steps S31 and S32 are performed, the process proceeds to Steps S14 and S15. In Step S15, it is determined whether it is satisfied that the parameter r is one, the mode Mode0 is less than 10 ms, and the frequency $C_0$ at the mode Mode0 is one or less (hereinafter, referred to as condition Y). In a case where condition Y is satisfied (Yes in Step S15), the access authentication is identified as being from a non-regular smartphone (Step S30). In a case where condition Y is not satisfied (No in Step S15), the process proceeds to Step S16. As above, access authentication from a regular smartphone in which a peak of frequencies appears at a transmission delay time of several ms or ten and several ms can be discriminated from access authentication from a non-regular smartphone.

The relation between an identification threshold and identification accuracy is illustrated in FIG. 8. The horizontal axis represents a predetermined threshold, and the vertical axis represents the identification accuracy. A rectangular data point represents the identification accuracy of access authentication from a computer, a triangular data point represents the identification accuracy of access authentication from a communication terminal 200 of a company other than companies A and B, and a circular data point represents the identification accuracy of access authentication from a communication terminal 200 of company A. Any one of the data points is in consideration of re-identification.

As the predetermined threshold becomes larger, it is more difficult for a total of highest frequencies to exceed the predetermined threshold (No in Step S26). Accordingly, while there are a few cases where access authentication from a non-regular smartphone is misidentified as access authentication from a regular smartphone, there are many cases where access authentication from a regular smartphone is misidentified as access authentication from a non-regular smartphone.

As the predetermined threshold becomes smaller, it is easier for a total of highest frequencies to exceed the predetermined threshold (Yes in Step S26). Accordingly, while there are a few cases where access authentication from a regular smartphone is misidentified as access authentication from a non-regular smartphone, however there are many cases where access authentication from a non-regular smartphone is misidentified as access authentication from a regular smartphone.

Thus, it is preferable that the predetermined threshold is set to a value that is not too large and is not too small. More specifically, in the case illustrated in FIG. 8, it is preferable that the predetermined threshold is set to a value of about 0.4.

In this embodiment, when a total of highest frequencies is more than the predetermined threshold, it is identified that there is access authentication from a regular smartphone, and, when a total of highest frequencies is less than the predetermined threshold, it is identified that there is access authentication from a non-regular smartphone. In the other embodiment, as a total of highest frequencies is further more than the predetermined threshold, it may be determined that the probability of being access authentication from a regular smartphone is higher, and, as the total of highest frequencies is further less than the predetermined threshold, it may be determined that the probability of being access authentication from a non-regular smartphone is higher.

In the other embodiment, in order to further improve the identification accuracy, identification elements such as the ID of a communication terminal 200, a unique ID generated within the network of the cellular phone company, the password of the communication terminal 200, and positional information of the communication terminal 200 may be used in a combined manner together with the distribution property of the transmission delay time and the incoming call reply to the telephone communication. By employing this embodiment, when it is determined that access authentication from a regular smartphone is performed with a considerably high probability, it may be determined that access authentication from a regular smartphone is assuredly performed in a case where a few number of identification elements are satisfied. By employing this embodiment, when it is determined that access authentication from a regular smartphone is performed with a slightly low probability, it may be determined that access authentication from a regular smartphone is assuredly performed for the first time in a case where a large number of identification elements are satisfied.

In this embodiment, while an example has been described in which the communication terminal 200 is determined as a regular smartphone or not, the communication terminal 200 may not be a smartphone. For example, the communication terminal may be a terminal such as a cellular phone capable of performing data communication together with performing a call by wireless communication.

In this embodiment, the authentication server 103 stores contents in the content storing unit 31. In the other embodiment, the authentication server 103 may not store contents, and a content server other than the authentication server 103 may store contents. In such a case, the data communication unit 32 may notify the communication terminal 200 of the approval of an access to contents and supply the contents stored in the content server other than the authentication server 103 to the communication terminal 200.

In this embodiment, the communication terminal 200 issues an access request and is notified whether or not an access can be made. In the other embodiment, a device other than the communication terminal 200 may issue an access request and be notified of an access approval. However, in both this embodiment and the other embodiment, it is not changed that the communication terminal 200 performs access authentication. In other words, in the other embodiment, the other device issues an access request, the authentication server 103 issues an authentication request to the communication terminal 200, the communication terminal 200 performs access authentication, and the authentication server 103 notifies the other device of an access approval and supplies contents. Here, the authentication server 103 may only supply contents instead of performing access approval. In such a case, the authentication server 103 memorizes information of the other device and information of the communication terminal 200 in association with each other. In addition, the other device may be connected through a wireless network or wired network.

(Embodiment 4)

Figure 12:
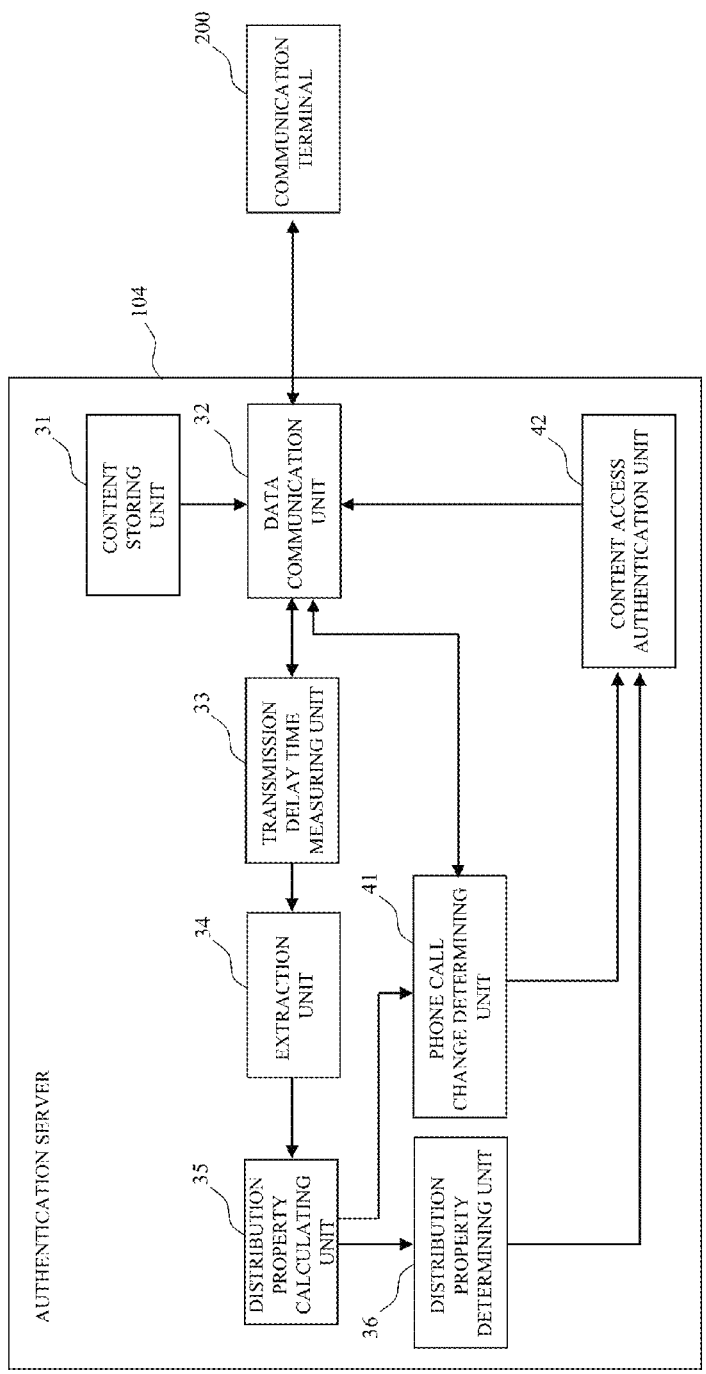
FIG. 12 illustrates an example of a content providing system according to Embodiment 4.

FIG. 12 illustrates an example of a content providing system according to Embodiment 4. The content providing system according this embodiment includes an authentication server 104 instead of the authentication server 103 illustrated in FIG. 9. The authentication server 104 does not include the phone call determining unit 38 and the content access authentication unit 37 but includes a phone call change determining unit 41 and a content access authentication unit 42.

In an authentication method by the authentication server according to this embodiment, the access authentication receiving step, the distribution property determining step, and the content access authentication step described in Embodiment 3 are sequentially included. Between the access authentication receiving step and the distribution property determining step and simultaneously with the distribution property determining step or between the distribution property determining step and the content access authentication step, the phone call change determining step is included.

In the phone call change determining step, the content providing system according to this embodiment operates as below. A data communication unit 32 performs telephone communication with a communication terminal 200 and outputs an indication representing that the telephone communication has been performed to the phone call change determining unit 41. The phone call change determining unit 41 determines whether or not the distribution property of the transmission delay time calculated by a distribution property calculating unit 34 has been changed. Then, the phone call change determining unit 41 compares the transmission delay time distribution properties before and after the acquisition of the indication representing that the telephone communication has been performed from the data communication unit 32. Then, the phone call change determining unit 41 determines whether or not the distribution property of the transmission delay time has been changed after the telephone communication of the data communication unit 32.

In a case where the communication terminal 200 is a regular smartphone, when a phone call is performed, in the communication terminal 200, the transmission delay time increases temporarily or continuously, or the communication for performing authentication is interrupted. In that case, there is a change of increasing the distribution of a long transmission delay time or decreasing the distribution of the transmission delay time as a whole. On the other hand, in a case where the communication terminal 200 is a non-regular smartphone, although when a phone call is performed, the transmission delay time does not increase temporarily or continuously, or the communication for performing authentication is not interrupted in the communication terminal 200. Accordingly, by detecting a change in the distribution property of the transmission delay time at the time of performing a phone call, it can be determined whether the communication terminal 200 is a smartphone or a wired computer.

In a case where the phone call change determining step is included, in the content access authentication step, the content providing system according to this embodiment operates as below.

In a case where the distribution property determining unit 36 determines discreteness, and the phone call change determining unit 41 determines that the distribution property of the transmission delay time has been changed, the content access authentication unit 42 approves an access to contents. Then, the data communication unit 32 notifies the communication terminal 200 of the approval of the access to contents and supplies contents stored in the content storing unit 31 to the communication terminal 200.

On the other hand, in a case where the distribution property determining unit 36 determines non-discreteness, or the phone call change determining unit 41 determines that the distribution property of the transmission delay time has not been changed, the content access authentication unit 42 denies the access to contents. Then, the data communication unit 32 notifies the communication terminal 200 of denial of the access to contents without transmitting the contents stored in the content storing unit 31 to the communication terminal 200.

In addition, immediately before or immediately after the phone call change determining step or simultaneously therewith, a phone call determining step may be further included. In such a case, the authentication server 104 further includes a phone call determining unit 38, and, in the content access authentication step, the content providing system according to this embodiment operates as below.

In a case where the distribution property determining unit 36 determines discreteness, the phone call change determining unit 41 determines that the distribution property of the transmission delay time has been changed, and the phone call determining unit 38 determines that an incoming call reply has been received, the content access authentication unit 42 approves an access to contents. Then, the data communication unit 32 notifies the communication terminal 200 of the approval of the access to contents and supplies contents stored in the content storing unit 31 to the communication terminal 200.

On the other hand, in a case where the distribution property determining unit 36 determines non-discreteness, the phone call change determining unit 41 determines that the distribution property of the transmission delay time has not been changed, or the phone call determining unit 38 determines that an incoming call reply has not been received, the content access authentication unit 42 denies the access to contents. Then, the data communication unit 32 notifies the communication terminal 200 of denial of the access to contents without transmitting the contents stored in the content storing unit 31 to the communication terminal 200. As a result, it can be determined whether the communication terminal is a smartphone or a computer further more accurately.

Embodiments of a second disclosure will be described with reference to the accompanying drawings. The embodiments described below are examples of the present disclosure, and the present disclosure is not limited thereto. In this specification and the drawings, like reference numerals denote like constituent elements.

(Embodiment 5)

Figure 15:
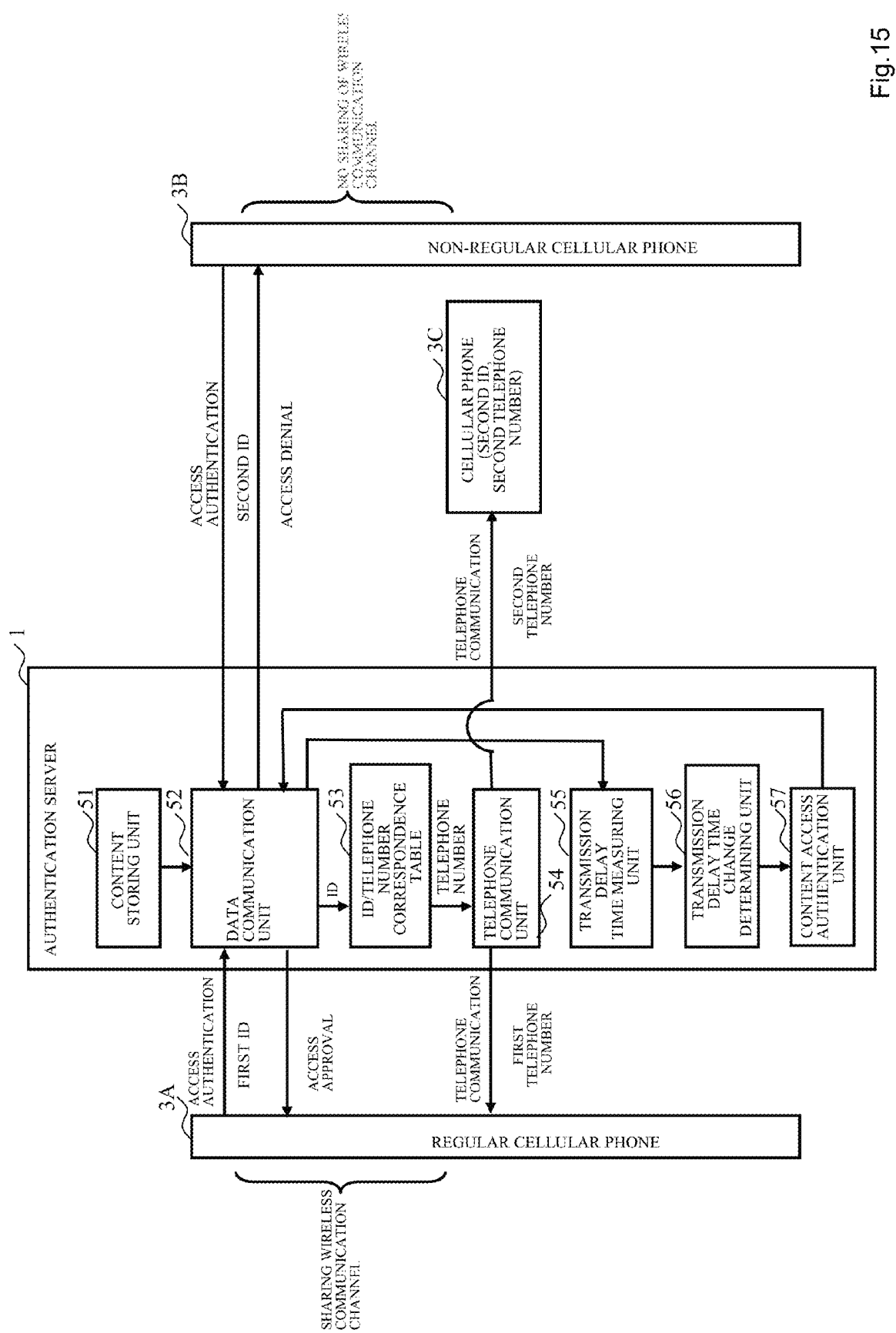
FIG. 15 is a diagram that illustrates the configuration of an authentication server according to Embodiment 5.

The configuration of an authentication server according to Embodiment 5 is illustrated in FIG. 15. When authentication of an access is received from a communication terminal 2, the authentication server 1 approves the access in a case where the communication terminal 2 is a regular cellular phone 3A, and the authentication server 1 denies the access in a case where the communication terminal 2 is a non-regular cellular phone 3B identified as a pretended cellular phone 3C.

The authentication server 1 is configured by a content storing unit 51, a data communication unit 52, an identification (ID)/telephone number correspondence table 53, a telephone communication unit 54, a transmission delay time measuring unit 55, a transmission delay time change determining unit 56, and a content access authentication unit 57.

The content storing unit 51 stores contents. The data communication unit 52 performs data communication with a communication terminal 2 performing authentication for an access to contents. The ID/telephone number correspondence table 53 associates the ID of a communication terminal 2 and a telephone number with each other. The telephone communication unit 54, when the data communication unit 52 performs authentication for an access to contents using an ID from the communication terminal 2, performs telephone communication using a telephone number associated with the ID in the ID/telephone number correspondence table 53. Here, this telephone communication transmits not only human speech data but also all the data. In addition, a correspondence table not illustrated in the figure may associate the password of a communication terminal 2 and a telephone number with each other. Hereinafter, a case will be described in which the ID of a communication terminal 2 and a telephone number are associated with each other.

The transmission delay time measuring unit 55 measures a transmission delay time between the data communication unit 52 and the communication terminal 2 over a plurality of times. The transmission delay time change determining unit 56 determines whether there is a change in the transmission delay time measured by the transmission delay time measuring unit 55 when the telephone communication unit 54 performs telephone communication, compared to when the telephone communication unit 54 does not perform telephone communication.

When the transmission delay time change determining unit 56 determines that there has been a change in the transmission delay time, the content access authentication unit 57 determines that the communication terminal 2 is a regular cellular phone 3A and approves the access to contents.

The ID and the telephone number of a regular cellular phone 3A are a first ID and a first telephone number respectively and are associated with each other in the ID/telephone number correspondence table 53. In other words, data communication and telephone communication are performed between a regular cellular phone 3A and the authentication server 1 and share a wireless communication channel. Accordingly, when the telephone communication is performed, an interrupt occurs in the data communication, and a change occurs in the transmission delay time.

When the transmission delay time change determining unit 56 determines that there has been no change in the transmission delay time, the content access authentication unit 57 determines that the communication terminal 2 is a non-regular cellular phone 3B identified as a pretended cellular phone 3C and denies the access to contents.

The ID and the telephone number of the cellular phone 3C are a second ID and a second telephone number respectively and are associated with each other in the ID/telephone number correspondence table 53. Here, the non-regular cellular phone 3B identified as a pretended cellular phone 3C can falsify an ID but cannot falsify a telephone number. In other words, while the data communication is performed between the non-regular cellular phone 3B and the authentication server 1, the telephone communication is performed between the cellular phone 3C and the authentication server 1, and both communications do not share a wireless communication channel. Accordingly, even when the telephone communication is performed, an interrupt does not occur in the data communication, and a change in the transmission delay time does not occur.

Figure 16:
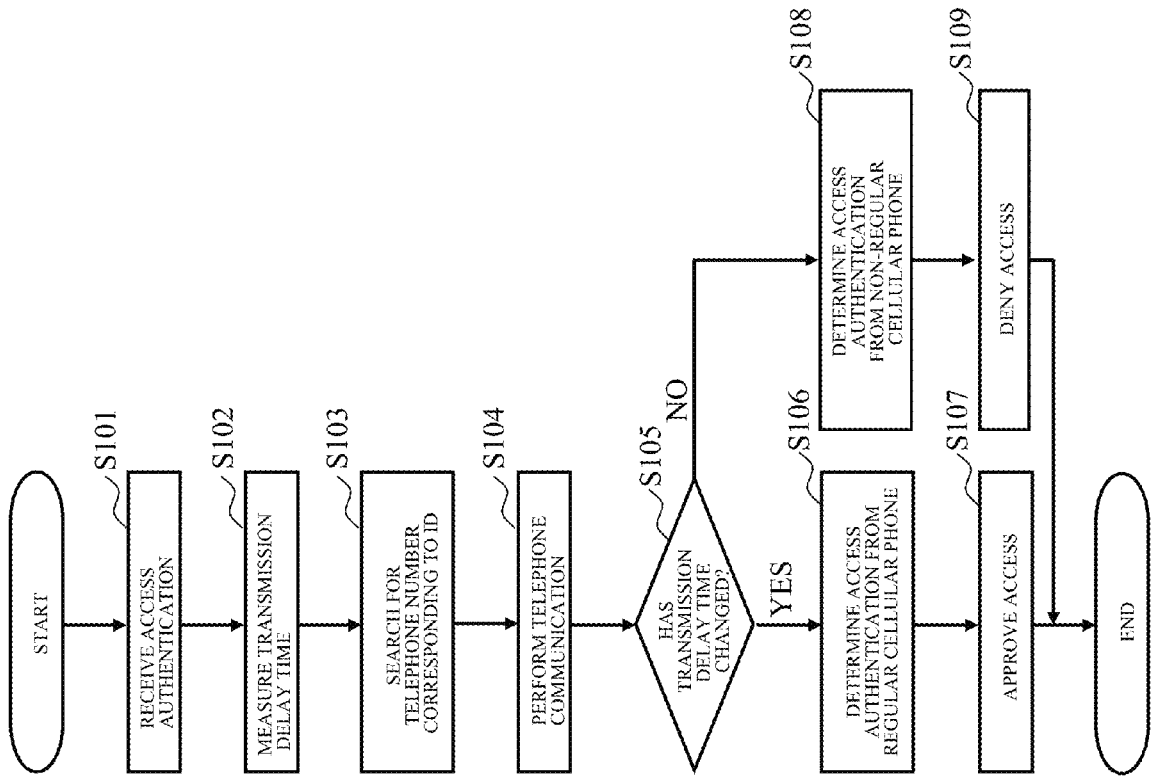
FIG. 16 is a diagram that illustrates the process of the authentication server according to Embodiment 5.

The process of the authentication server is illustrated in FIG. 16. In a content access authentication receiving step, the data communication unit 52 receives authentication for an access to contents performed by the communication terminal 2 (Step S101).

In a telephone communication performing step, while the transmission delay time measuring unit 55 measures a transmission delay time delayed with respect to the communication terminal 2 over a plurality of times (Step S102), the telephone communication unit 54 searches the ID/telephone number correspondence table 53 for a telephone number associated with the ID used for the authentication for the access to contents (Step S103) and performs telephone communication using the telephone number (Step S104).

In a transmission delay time change determining step, the transmission delay time change determining unit 56 determines whether there is a change in the transmission delay time measured by the transmission delay time measuring unit 55 when the telephone communication unit 54 performs telephone communication, compared to when the telephone communication unit 54 does not perform the telephone communication (Step S105). The transmission delay time change determining step will be described in detail with reference to FIG. 18.

In a content access authentication step, when the transmission delay time change determining unit 56 determines that there has been a change in the transmission delay time (Yes in Step S105), the content access authentication unit 57 determines that the communication terminal 2 is a regular cellular phone 3A (Step S106) and approves the access to contents (Step S107). Then, the data communication unit 52 notifies the regular cellular phone 3A of the approval of the access to contents and supplies the contents stored in the content storing unit 51 to the regular cellular phone 3A. Here, the data communication unit 52 may supply only the contents stored in the content storing unit 51 to the regular cellular phone 3A instead of the approval of the access to contents.

When the transmission delay time change determining unit 56 determines that there has been no change in the transmission delay time (No in Step S105), the content access authentication unit 57 determines that the communication terminal 2 is a non-regular cellular phone 3B identified as a pretended cellular phone 3C (Step S108) and denies the access to contents (Step S109). Then, the data communication unit 52 notifies the non-regular cellular phone 3B of the denial of the access to contents.

According to the second disclosure, it can be checked whether or not the communication terminal performing authentication and the communication terminal receiving telephone communication are the same. Accordingly, when the access to contents is limited to cellular phone user, it can be determined securely and accurately whether or not a cellular phone user is a regular user.

Figure 17:
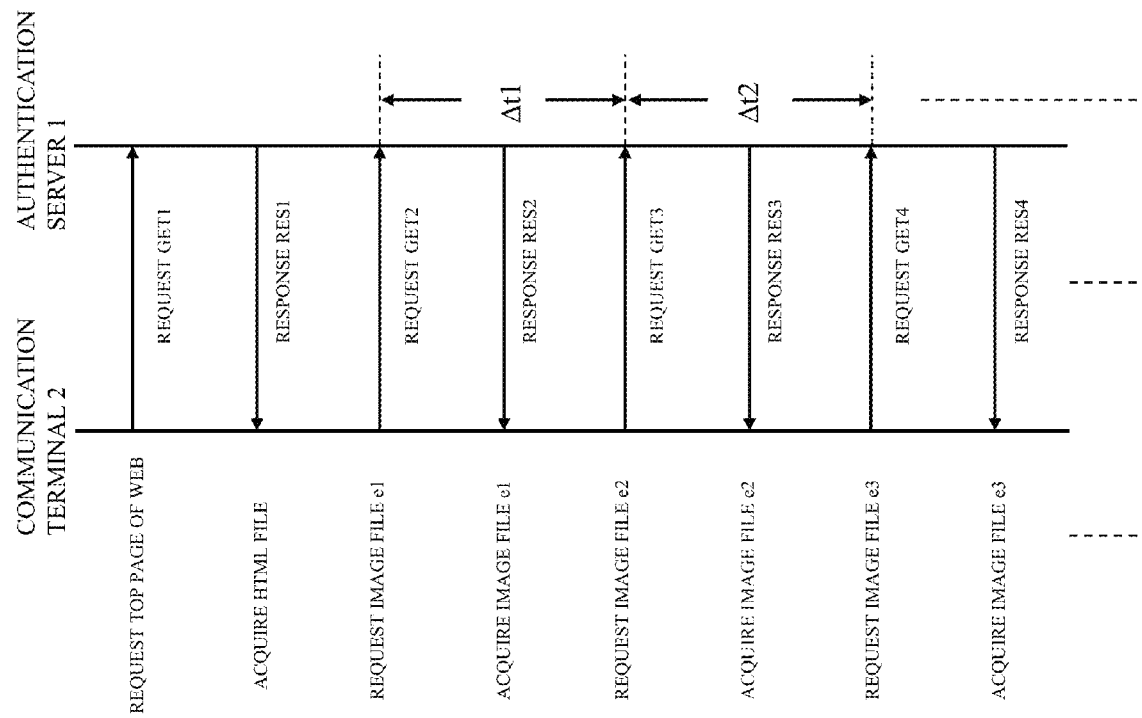
FIG. 17 is a diagram that illustrates a method of measuring a transmission delay time.

Next, the telephone communication performing step will be described in detail. A method of measuring a transmission delay time is illustrated in FIG. 17. The communication terminal 2 requests the top page of a web by transmitting a request GET1 to the authentication server 1. The data communication unit 52 supplies an HTML file by transmitting a response RES1 to the communication terminal 2. The communication terminal 2 analyzes the HTML file and requests a plurality of image files included in the HTML file as below.

The communication terminal 2 requests an image file e1 by transmitting a request GET2 to the authentication server 1. The data communication unit 52 supplies the image file e1 by transmitting a response RES2 to the communication terminal 2. The communication terminal 2 requests an image file e2 by transmitting a request GET3 to the authentication server 1. The data communication unit 52 supplies the image file e2 by transmitting a response RES3 to the communication terminal 2. The communication terminal 2 requests an image file e3 by transmitting a request GET4 to the authentication server 1. The data communication unit 52 supplies the image file e3 by transmitting a response RES4 to the communication terminal 2. Until the communication terminal 2 acquires all the image files included in the HTML file, the above-described process is repeated.

The transmission delay time measuring unit 55 measures a time Δt1 that is a time until a next request GET3 is received from the communication terminal 2 after the request GET2 is received from the communication terminal 2 as a total of a transmission delay time from the data communication unit 52 to the communication terminal 2 and a transmission delay time from the communication terminal 2 to the data communication unit 52. The transmission delay time measuring unit 55 measures a time Δt2 that is a time until a next request GET4 is received from the communication terminal 2 after the request GET3 is received from the communication terminal 2 as a total of a transmission delay time from the data communication unit 52 to the communication terminal 2 and a transmission delay time from the communication terminal 2 to the data communication unit 52. Until the data communication unit 52 supplies all the image files included in the HTML file, the above-described process is repeated.

Here, it is preferable that the transmission delay time measuring unit 55 does not measure a time until a next request GET2 is received from the communication terminal 2 after a request GET1 is received from the communication terminal 2. The reason for this is that the time not only includes the transmission delay time from the data communication unit 52 to the communication terminal 2 and the transmission delay time from the communication terminal 2 to the data communication unit 52 but also includes an HTML file analyzing time of the communication terminal 2.

The regular cellular phone 3A may include a web browser and may not include software used for measuring a transmission delay time, and the development of new software is not necessary.

Figure 20:
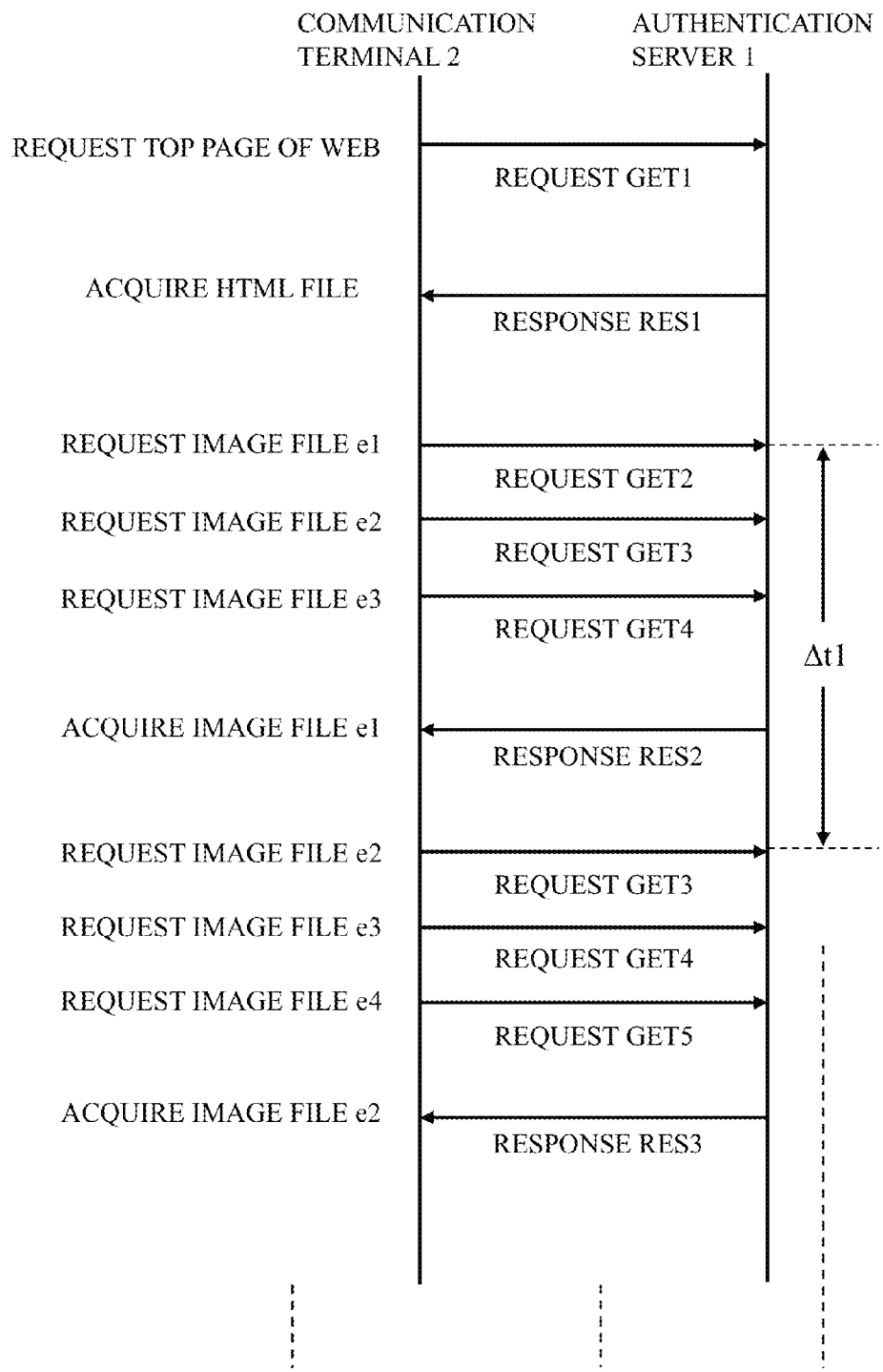
FIG. 20 is a diagram that illustrates a method of measuring a transmission delay time in a case where pipeline processing is performed.

There are cellular phones 3A that perform pipeline processing. The pipeline processing is a process capable of accessing a page at high speed by transmitting request signals altogether. For example, as illustrated in FIG. 20, the communication terminal 2 transmits a request GET2 that is a request signal for the image file e1, a request GET3 that is a request signal for the image file e2, and a request GET4 that is a request signal for the image file e3 altogether. In the case of the cellular phone 3A that performs such pipeline processing, the cellular phone 2A almost simultaneously transmits the requests GET2 and GET3, and thus, a total of the transmission delay times may not be measured even by measuring a time from the request GET2 to the request GET3. Accordingly, the data communication unit 52 of the authentication server 1 sequentially repeats the reception of one request signal and the transmission of one data element. Then, the transmission delay time measuring unit 53 measures a total of the transmission delay times by measuring a reception interval of each request signal.

For example, when the requests GET2, GET3, and GET4 are received altogether, the data communication unit 52 transmits a response RES2 for the request GET2 to the communication terminal 2, and, thereafter, the data communication unit 52 closes a TCP connection after the transmission of the response RES2. As above, for the requests GET3 and GET4, responses RES3 and RES4 are not transmitted. As a result, after the response RES2 is received, the communication terminal 2 retransmits the request GET3.

The transmission delay time measuring unit 53 measures a time Δt1 that is a time until the retransmitted request GET3 is received after the request GET2 out of the requests GET2, GET3, and GET4 received altogether is received as a total of a transmission delay time from the data communication unit 52 to the communication terminal 2 and a transmission delay time from the communication terminal 2 to the data communication unit 52.

In order to respond to the cellular phone 3A performing pipeline processing, the data communication unit 52 that has received the request GET1 requesting for the top page of the web may stop the pipeline processing of the communication terminal 2 by transmitting the indication of not responding to the pipeline processing to the communication terminal 2. More specifically, the indication of the HTTP of a specification of HTTP/1.0 or HTTP/0.9 is transmitted to the communication terminal 2. By doing so, as illustrated in FIG. 17, the measurement of a transmission delay time in which the reception of one request signal and the transmission of one data element are sequentially repeated can be performed.

Figure 21:
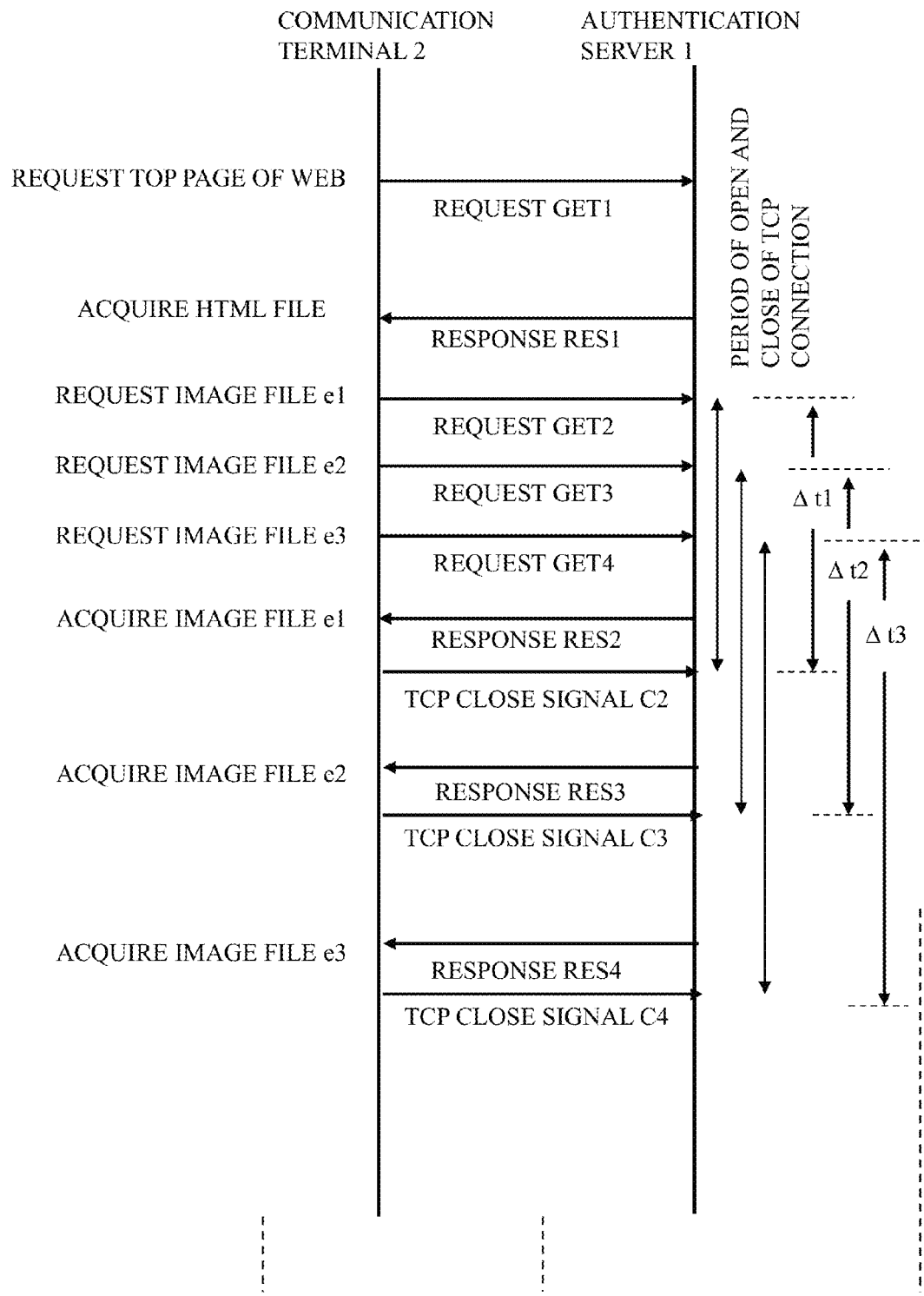
FIG. 21 is a diagram that illustrates another example of the method of measuring a transmission delay time.

FIG. 21 illustrates the other example of the method of measuring a transmission delay time used in the transmission delay time measuring unit 53. When an image file e2 is received, the communication terminal 2 transmits a close signal (FIN) C2 of the TCP to the authentication server 1. In this method, an interval, which is a time until a close signal after the transmission of a data element is received after a reception signal is received by the authentication server 1, is measured as a transmission delay time by using the close signal (FIN) of the TCP. For example, the transmission delay time measuring unit 53 measures an interval until the reception of the close signal C2 from the communication terminal 2 after the reception of a request GET2 in the authentication server 1 as a transmission delay time $\Delta t1$.

This method can be applied not to a pipeline type but to a case where a plurality of TCP connections are set up simultaneously. Accordingly, transmission delay times can be simultaneously measured in correspondence with the number of the plurality of connections, and downloading of an image at high speed can be achieved. In a case where the size of the image is large, while a close time for a request GET transmitted later is delayed, and the transmission delay time is predicted to be lengthened, the transmission delay characteristic between the communication terminal 2 and the authentication server 1 is included and, accordingly, can be used as processing data.

Figure 18:
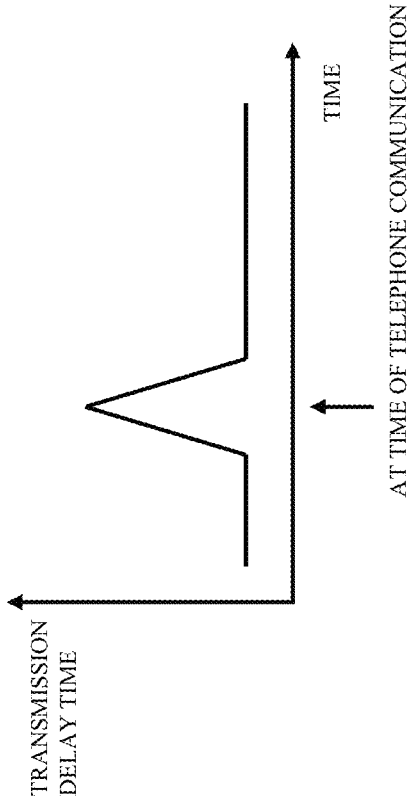
FIG. 18 is a diagram that illustrates the content of a change in a transmission delay time in a case where a regular cellular phone performs access authentication.
Figure 19:
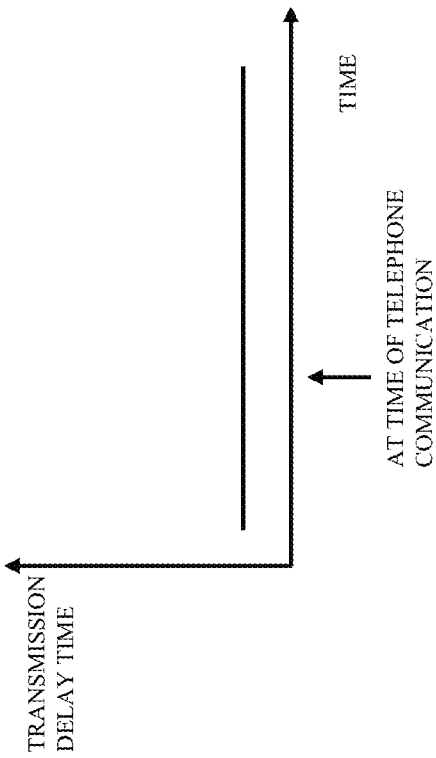
FIG. 19 is a diagram that illustrates the content of a change in a transmission delay time in a case where a non-regular cellular phone performs access authentication.

Next, the transmission delay time change determining step will be described in detail. The contents of changes in the transmission delay time are illustrated in FIGS. 18 and 19. As an example of the contents of changes in the transmission delay time, a temporal change in the transmission delay time at the time of access authentication from a regular cellular phone 3A is illustrated in FIG. 18, and a temporal change in the transmission delay time at the time of access authentication from a non-regular cellular phone 3B is illustrated in FIG. 19.

First a first example of the temporal change in the transmission delay time will be described. The transmission delay time change determining unit 56, as illustrated in FIGS. 18 and 19, determines whether or not there is an increase in the transmission delay time measured by the transmission delay time measuring unit 55 when the telephone communication unit 54 performs telephone communication from the transmission delay time at a time when the telephone communication unit 54 does not perform telephone communication.

As illustrated in FIG. 18, when the transmission delay time change determining unit 56 determines that there is an increase in the transmission delay time, the content access authentication unit 57 determines that the communication terminal 2 is a regular cellular phone 3A and approves an access to contents. After the telephone communication is stopped, the transmission delay time is returned to the original transmission delay time as before the telephone communication started.

As illustrated in FIG. 19, when the transmission delay time change determining unit 56 determines that there has been no increase in the transmission delay time, the content access authentication unit 57 determines that the communication terminal 2 is a non-regular cellular phone 3B and denies the access to contents.

Next, a second example of the temporal change in the transmission delay time will be described. The transmission delay time change determining unit 56 determines whether or not a packet used for measuring the transmission delay time has been received from the communication terminal 2 by the data communication unit 52 when the telephone communication unit 54 performs telephone communication, compared to when the telephone communication unit 54 does not perform telephone communication. Here, the packets used for measuring the transmission delay time, for example, are requests GET2, GET3, GET4, . . . illustrated in FIG. 17.

When the transmission delay time change determining unit 56 determines that there is no reception of the packet used for measuring the transmission delay time, the content access authentication unit 57 determines that the communication terminal 2 is a regular cellular phone 3A and approves the access to contents. After the telephone communication is stopped, the packet used for measuring transmission delay time may not be re-transmitted.

When the transmission delay time change determining unit 56 determines that there is reception of a packet used for measuring the transmission delay time, the content access authentication unit 57 determines that the communication terminal 2 is a non-regular cellular phone 3B and denies the access to contents.

Next, a third example of the temporal change in the transmission delay time will be described. The transmission delay time change determining unit 56 determines whether or not there is a decrease in the transmission delay time measured by the transmission delay time measuring unit 55 when the telephone communication unit 54 performs telephone communication from the transmission delay time compared to a time when the telephone communication unit 54 does not perform telephone communication. Here, the reason for the possibility of a decrease in the transmission delay time is that a regular cellular phone 3A or a non-regular cellular phone 3B may increase the processing capability when telephone communication interrupts data communication.

When the transmission delay time change determining unit 56 determines that there is a decrease in the transmission delay time, the content access authentication unit 57 determines that the communication terminal 2 is a regular cellular phone 3A and approves the access to contents. After the telephone communication is stopped, the transmission delay time is returned to the original transmission delay time as before the telephone communication started.

When the transmission delay time change determining unit 56 determines that there has been no decrease in the transmission delay time, the content access authentication unit 57 determines that the communication terminal 2 is a non-regular cellular phone 3B and denies the access to contents.

The content of the change in the transmission delay time may be variously set for each regular cellular phone 3A. When the content is set for each regular cellular phone 3A, a storage unit of the authentication server 1, which is not illustrated in the figure, may store the contents of changes. When the content is not set for each regular cellular phone 3A, the transmission delay time change determining unit 56 may determine whether or not there is any change.

In this embodiment, the content access authentication unit 57 determines whether or not an access to contents is approved based on whether there is a change in the transmission delay time. In the other embodiment, the content access authentication unit 57 determines whether an access to contents is approved based on whether there is a change in the transmission delay time and whether or not there has been an incoming call reply from the communication terminal 2 for telephone communication.

In other words, in the other embodiment, when an incoming call reply is made from the communication terminal 2 for telephone communication after the transmission delay time change determining unit 56 determines that there is a change in the transmission delay time, the content access authentication unit 57 determines that the communication terminal 2 is a regular cellular phone 3A and approves an access to contents. In addition, when the transmission delay time change determining unit 56 determines that there has been a change in the transmission delay time, and there has been no incoming call reply from the communication terminal 2 for the telephone communication, the content access authentication unit 57 determines that the communication terminal 2 is a non-regular cellular phone 3B identified as a pretended cellular phone 3C and denies the access to contents. As a result, it can be determined more securely and accurately whether or not a user using a cellular phone is a regular user. Here, the incoming call reply may be returned as the communication terminal 2 detects a user's voice, or the incoming call reply may be returned as the communication terminal 2 outputs automatic speech using software installed thereto. In addition, the incoming call reply may be returned as the communication terminal 2 detects user's pressing a reception button, or the incoming call reply may be returned as the communication terminal 2 transmits a signal using software installed thereto.

In this embodiment, the authentication server 1 stores contents in the content storing unit 51. In the other embodiment, the authentication server 1 may not store contents, but a content server other than the authentication server 1 may store contents. In such a case, the data communication unit 52 may notify a regular cellular phone 3A of the approval of the access to contents and supply the contents stored in the content server other than the authentication server 1 to the regular cellular phone 3A.

In this embodiment, the regular cellular phone 3A or the non-regular cellular phone 3B issues an access request and is notified whether an access can be made or not. In the other embodiment, a device other than the regular cellular phone 3A may issue an access request and be approved of an access approval. However, in both this embodiment and the other embodiment, it is not changed that the regular cellular phone 3A performs access authentication. In other words, in the other embodiment, the other device issues an access request, the authentication server 1 issues an authentication request to the regular cellular phone 3A, the regular cellular phone 3A performs access authentication, and the authentication server 1 notifies the other device of an access approval and supplies contents. Here, the authentication server 1 may only supply contents instead of performing access authentication. In such a case, the authentication server 1 stores information of the other device and information of the regular cellular phone 3A in association with each other.

INDUSTRIAL APPLICABILITY

The first disclosure can be applied to an information communication industry.

An authentication server and an authentication method by an authentication server according to this second disclosure can be used when an access to contents is performed with being limited to cellular phone's users.

REFERENCE SIGNS LIST

1 Authentication server
2 Communication terminal
2A Cellular phone
2B Computer
11 Content storing unit
12 Data communication unit
13 Transmission delay time measuring unit
14 Transmission delay time distribution property determining unit
15 Content access authentication unit
31 Content storing unit
32 Data communication unit
33 Transmission delay time measuring unit
34 Distribution property calculating unit
35 Extraction unit
36 Distribution property determining unit
37, 42 Content access authentication unit
38 Phone call determining unit
41 Phone call change determining unit
103, 104 Authentication server
200 Communication terminal
1 Authentication server
2 Communication terminal
3A, 3B, 3C Cellular phone
51 Content storing unit
52 Data communication unit
53 ID/telephone number correspondence table
54 Telephone communication unit
55 Transmission delay time measuring unit
56 Transmission delay time change determining unit
57 Content access authentication unit

What is claimed is:

1. An authentication server which includes a microprocessor and a storage memory, said server comprising:
    a data communication part of the server that performs data communication with a communication terminal performing authentication for an access to contents;
    a correspondence table that associates an identifier or a password of the communication terminal with a telephone number of the communication terminal;
a telephone communication part of the server that performs telephone communication using the telephone number associated with the identifier or the password in the correspondence table when the data communication part of the server performs authentication for an access to contents using the identifier or the password from the communication terminal;
    a transmission delay time measuring part of the server that measures a transmission delay time between the data communication part of the server and the communication terminal over a plurality of times;
    a transmission delay time change determining part of the server that determines whether or not the transmission delay time measured by the transmission delay time measuring part of the server at a time when the telephone communication part of the server performs telephone communication has changed from the transmission delay time at a time when the telephone communication part of the server does not perform the telephone communication; and
    a content access authentication part of the server that approves the access to the contents when the transmission delay time is determined to have changed by the transmission delay time change determining part of the server and denies the access to the contents when the transmission delay time is determined not to have changed by the transmission delay time change determining part of the server;
wherein the content access authentication part of the server determines that when there has been a change in the transmission delay time, telephone communication and data communication are performed between a regular terminal and the authentication server, and the communication terminal is a regular terminal, and
wherein the content access authentication part of the server determines that when there has been no change in the transmission delay time, telephone communication is performed between a regular terminal and the authentication server, but data communication is performed between a non-regular terminal as a pretended regular terminal and the authentication server, and the communication terminal is a non-regular terminal as a pretended regular terminal.

2. The authentication server according to claim 1,
wherein the data communication part of the server transmits an HTML file including a plurality of data elements to the communication terminal and receives request signals requesting the data elements from the communication terminal, and
wherein the transmission delay time measuring part of the server measures a total of a transmission delay time from the data communication part of the server to the communication terminal and a transmission delay time from the communication terminal to the data communication part of the server by measuring intervals at which the request signals requesting the data elements are received from the communication terminal.

3. The authentication server according to claim 2,
wherein the data communication part of the server sequentially repeats reception of one of the request signals and transmission of one of the data elements, and
wherein the transmission delay time measuring part of the server measures the total of the transmission delay times by measuring intervals at which the request signals are received.

4. The authentication server according to claim 1,
wherein the data communication part of the server receives a close signal of a connection from the communication terminal that has received the data elements, and
wherein the transmission delay time measuring part of the server measures a total of a transmission delay time from the data communication part of the server to the communication terminal and a transmission delay time from the communication terminal to the data communication part of the server by measuring a time interval until reception of the close signal after reception of the request signals.

5. The authentication server according to claim 1,
wherein the transmission delay time change determining part of the server determines whether or not the transmission delay time measured by the transmission delay time measuring part of the server has increased at a time when the telephone communication part of the server performs telephone communication from the transmission delay time at a time when the telephone communication part of the server does not perform the telephone communication, and
wherein the content access authentication part of the server approves the access to the contents when the transmission delay time change determining part of the server determines that the transmission delay time has increased and denies the access to the contents when the transmission delay time change determining part of the server determines that the transmission delay time has not increased.

6. The authentication server according to claim 1,
wherein the transmission delay time change determining part of the server determines whether or not the data communication part of the server has received a packet used for measuring the transmission delay time from the communication terminal when the telephone communication part of the server performs telephone communication, compared to when the telephone communication part of the server does not perform the telephone communication, and
wherein the content access authentication part of the server approves the access to the contents when the transmission delay time change determining part of the server determines that the packet used for measuring the transmission delay time has not been received and denies the access to the contents when the transmission delay time change determining part of the server determines that the packet used for measuring the transmission delay time has received.

7. The authentication server according to claim 1, wherein the content access authentication part of the server approves the access to the contents when the transmission delay time change determining part of the server determines that the transmission delay time has changed and an incoming call reply has been made for the telephone communication from the communication terminal and denies the access to the contents when the transmission delay time change determining part of the server determines that the transmission delay time has changed and an incoming call reply has not been made from the communication terminal for the telephone communication.

8. An authentication method by an authentication server, the authentication method sequentially comprising:
a content access authentication receiving step for receiving authentication for an access to contents that is performed by a communication terminal;
a telephone communication performing step for performing telephone communication using a telephone number associated with an identifier or a password used for the authentication for the access to contents while a transmission delay time delayed with respect to the communication terminal is measured a plurality of times;
a transmission delay time change determining step for determining whether or not the measured transmission delay time at a time when telephone communication is performed has changed from the transmission delay time at a time when the telephone communication is not performed; and
a content access authentication step for approving the access to the contents when the transmission delay time is determined to have changed and denying the access to the contents when the transmission delay time is determined not to have changed;
wherein the content access authentication step determines that when there has been a change in the transmission delay time, telephone communication and data communication are performed between a regular terminal and the authentication server, and the communication terminal is a regular terminal, and
wherein the content access authentication step determines that when there has been no change in the transmission delay time, telephone communication is performed between a regular terminal and the authentication server, but data communication is performed between a non-regular terminal as a pretended regular terminal and the authentication server, and the communication terminal is a non-regular terminal as a pretended regular terminal.

9. The authentication method by an authentication server according to claim 8, wherein, in the telephone communication performing step, an HTML file including a plurality of data elements is transmitted to the communication terminal, request signals requesting the data elements are received from the communication terminal, and a total of a transmission delay time from the authentication server to the communication terminal and a transmission delay time from the communication terminal to the authentication server is measured by measuring intervals at which the request signals requesting the data elements are received from the communication terminal.

10. The authentication method by an authentication server according to claim 9, wherein, in the telephone communication performing step, reception of one of the request signals and transmission of one of the data elements are sequentially repeated, and a total of the transmission delay times is measured by measuring intervals at which the request signals are received.

11. The authentication method by an authentication server according to claim 8, wherein, in the telephone communication performing step, a close signal of a connection is received from the communication terminal that has received the data elements, and a total of a transmission delay time from the authentication server to the communication terminal and a transmission delay time from the communication terminal to the authentication server is measured by measuring a time interval until reception of the close signal after reception of the request signals.

12. The authentication method by an authentication server according to claim 8,
wherein, in the transmission delay time change determining step, it is determined whether or not the measured transmission delay time has increased at a time when the telephone communication is performed from the transmission delay time at a time when the telephone communication is not performed, and
wherein, in the content access authentication step, the access to the contents is approved when the transmission delay time is determined to have increased and the access to the contents is denied when the transmission delay time is determined not to have increased.

13. The authentication method by an authentication server according to claim 8,
wherein, in the transmission delay time change determining step, it is determined whether or not a packet used for measuring the transmission delay time is received from the communication terminal when telephone communication is performed, compared to when the telephone communication is not performed, and
wherein, in the content access authentication step, the access to the contents is approved when the packet used for measuring the transmission delay time is determined not to have been received and the access to the contents is denied when the packet used for measuring the transmission delay time is determined to have been received.

14. The authentication method by an authentication server according to claim 8, wherein, in the content access authentication step, the access to the contents is approved when the transmission delay time is determined to have changed in the transmission delay time change determining step and an incoming call reply has been made from the communication terminal for the telephone communication and the access to the contents is denied when the transmission delay time is determined to have changed in the transmission delay time change determining step and an incoming call reply has not been made from the communication terminal for the telephone communication.

* * * * *